US011223552B1

(12) United States Patent
Anderson et al.

(10) Patent No.: US 11,223,552 B1
(45) Date of Patent: Jan. 11, 2022

(54) AGGREGATION-BASED DETERMINATION OF CLOUD COMPUTING SERVICE RESILIENCY TO CHAOS EVENTS

(71) Applicant: Microsoft Technology Licensing, LLC, Redmond, WA (US)

(72) Inventors: David Dominic Anderson, Renton, WA (US); Piyush Gupta, Sammamish, WA (US); Jeremy Michael Bares, Seattle, WA (US); Weili Zhong McClenahan, Seattle, WA (US); Craig Henry Wittenberg, Clyde Hill, WA (US); Christopher Grant Ashton, Redmond, WA (US); Ritchie Nicholas Hughes, Salt Lake City, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/145,200

(22) Filed: Jan. 8, 2021

(51) Int. Cl.
*H04L 12/26* (2006.01)
*G06F 16/28* (2019.01)

(52) U.S. Cl.
CPC ............ *H04L 43/16* (2013.01); *G06F 16/285* (2019.01)

(58) Field of Classification Search
CPC ........ H04L 43/00; H04L 43/16; G06F 16/285
See application file for complete search history.

(56) References Cited

U.S. PATENT DOCUMENTS

| 9,590,877 | B2 |   | 3/2017  | Choudhary et al. |            |
|-----------|----|---|---------|------------------|------------|
| 9,864,666 | B2 |   | 1/2018  | Tseitlin et al.  |            |
| 10,275,331| B1 | * | 4/2019  | Gudka            | H04L 43/50 |
| 10,691,516| B2 | * | 6/2020  | Arora            | G06Q 10/0635 |
| 2014/0164454 | A1 | * | 6/2014 | Zhirkov       | G06F 16/185 |
|           |    |   |         |                  | 707/829    |
| 2014/0337674 | A1 | * | 11/2014 | Ivancic       | H04L 43/50 |
|           |    |   |         |                  | 714/43     |
| 2018/0293120 | A1 | * | 10/2018 | Arora         | G06F 11/3006 |
| 2020/0092334 | A1 | * | 3/2020  | Hiebert       | G06F 11/1461 |

OTHER PUBLICATIONS

"Chaos Monkey", Retrieved from: https://web.archive.org/web/20201111164209/https:/netflix.github.io/chaosmonkey/, Nov. 11, 2020, 2 Pages.

(Continued)

*Primary Examiner* — Minh Chau Nguyen
(74) *Attorney, Agent, or Firm* — Wade IP Law PLLC

(57) ABSTRACT

Techniques are described herein that are capable of performing an aggregation-based determination of resiliency of a cloud computing service to chaos events. Chaos events are executed against a cloud computing service during a time frame that includes multiple time periods. For each chaos event, service health indexes (SHIs) that correspond to the time periods are calculated. Each SHI indicates an extent to which indicators, which represent respective measurements of performance of the cloud computing service during the respective time period, satisfy respective criteria. The SHIs for each chaos event are analyzed to provide a respective resiliency score. At least some of the resiliency scores of the respective chaos events are aggregated to provide an aggregated resiliency score, which represents resiliency of the cloud computing service to the chaos events.

21 Claims, 9 Drawing Sheets

(56) References Cited

OTHER PUBLICATIONS

"The Comprehensive Chaos Engineering Platform", Retrieved from: https://www.gremlin.com/product/?ref=nav#scenarios. Retrieved Date: Oct. 13, 2020, 13 Pages.

Alvaro, et al., "Automating Failure Testing Research at Internet Scale", In Proceedings of the Seventh ACM Symposium on Cloud Computing, Oct. 5, 2016, 12 Pages.

Russinovich, Mark, "Advancing resilience through chaos engineering and fault injection", Retrieved from: https://azure.microsoft.com/en-in/blog/advancing-resilience-through-chaos-engineering-and-fault-injection/, Jul. 27, 2020, 9 Pages.

Torkura, et al., "CloudStrike: Chaos Engineering for Security and Resiliency in Cloud Inftastructure", In Journal of IEEE Access, Jul. 2020, 17 Pages.

* cited by examiner

AGGREGATION-BASED DETERMINATION OF CLOUD COMPUTING SERVICE RESILIENCY TO CHAOS EVENTS

BACKGROUND

A cloud computing service is a cloud-based service (e.g., software service) that is configured to provide shared computer system resources (e.g., computer processing and/or data storage) to computing devices on demand. For instance, the cloud computing service may provide such computer system resources to a user of the cloud computing service without direct active management by the user. Chaos engineering enables chaos events to be executed against a cloud computing service to determine whether the cloud computing service is capable of tolerating such chaos events (e.g., while maintaining an adequate quality of service). The ability of a cloud computing device to tolerate chaos events is referred to as the resiliency of the cloud computing device to the chaos events.

A variety of techniques has been proposed to inject chaos events into a cloud computing service. However, each such technique has its limitations. For instance, Gremlin® chaos engineering software, developed and distributed by Gremlin Inc., is capable of injecting failures in a distributed computer system. However, the Gremlin® chaos engineering software relies on users recording resiliency outcomes manually. Chaos Monkey™ chaos engineering software, developed and distributed by Netflix, Inc., is capable of randomly terminating a cloud computing service in production. However, the Chaos Monkey™ chaos engineering software does not quantify resiliency outcomes other than offering the capability to plug in an outage checker which can automatically abort chaos in the event of a detected outage.

SUMMARY

Various approaches are described herein for, among other things, performing an aggregation-based determination of resiliency of a cloud computing service to chaos events. A chaos event is an event that applies stress on operational performance of a cloud computing service. For instance, the chaos event may be configured to reduce a quality of service of the cloud computing service. A chaos event may be a synthetic event or an organic event. A synthetic event is a chaos event that is planned by a user (e.g., administrator or third-party) of a cloud computing service to be executed against the cloud computing service. For instance, the synthetic event may be purposefully or intentionally imposed on the cloud computing service. An organic event is a chaos event that is not planned by a user of a cloud computing service to be executed against the cloud computing service. For example, the organic event may occur in the ordinary course of execution (e.g., under ordinary operating conditions).

A cloud computing service is capable of measuring its performance during execution of a chaos event. For instance, the cloud computing service may generate indicators that represent measurements of the performance of the cloud computing service with regard to respective attributes of the cloud computing service. Examples of an attribute of a cloud computing service include but are not limited to a response time, latency, success rate, availability, error rate, traffic volume, requests per second (RPS), and operations per second (OPS) of the cloud computing service. An operation is a unit of work (e.g., request or job) that is performed by the cloud computing service. The measurements of the performance of the cloud computing service and the corresponding indicators that are generated by the cloud computing service may indicate changes in an operational health of the cloud computing service. For instance, the operational health of the cloud computing service may be dictated by how closely the measurements align with predefined targets. Operational health of a cloud computing service indicates an extent to which one or more technical issues negatively impact (e.g., degrade or disrupt) operation of the cloud computing service. Examples of the operation of the cloud computing service being degraded include but are not limited to the cloud computing service performing more slowly than usual (e.g., more slowly than a threshold rate), the operation of the cloud computing service being intermittently interrupted, and a feature (e.g., functionality) of the cloud computing service not working (e.g., within a threshold tolerance or at all). The operation of the cloud computing service is disrupted when one or more technical issues inhibit (e.g., prevent) one or more (e.g., all) users of the cloud computing service from accessing the cloud computing service.

The cloud computing service may measure its performance and generate such indicators for each of multiple time periods. The cloud computing service may generate a service health index (SHI) for each time period, indicating an extent to which the indicators for that time period satisfy respective criteria (e.g., fall within specified thresholds). The cloud computing device may generate a resiliency score based on (e.g., based at least in part on) the SHIs for the respective time periods (e.g., by performing a mathematical operation on the SHIs). The cloud computing service may generate resiliency scores for multiple chaos events in the same manner discussed above. The cloud computing service may then aggregate at least some of the resiliency scores to generate an aggregated resiliency score that represents resiliency of the cloud computing service to the chaos events.

In an example approach of performing aggregation-based determination of cloud computing service resiliency to chaos events, multiple chaos events are executed against a cloud computing service during a time frame that includes multiple time periods. For each of the chaos events, SHIs that correspond to the time periods are calculated. Each SHI indicates an extent to which indicators, which represent respective measurements of performance of the cloud computing service that are performed with regard to respective attributes of the cloud computing service during the respective time period, satisfy respective criteria. For each of the chaos events, the SHIs for the respective chaos event are analyzed to provide a respective resiliency score. At least some of the resiliency scores of the respective chaos events are aggregated to provide an aggregated resiliency score, which represents resiliency of the cloud computing service to the chaos events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
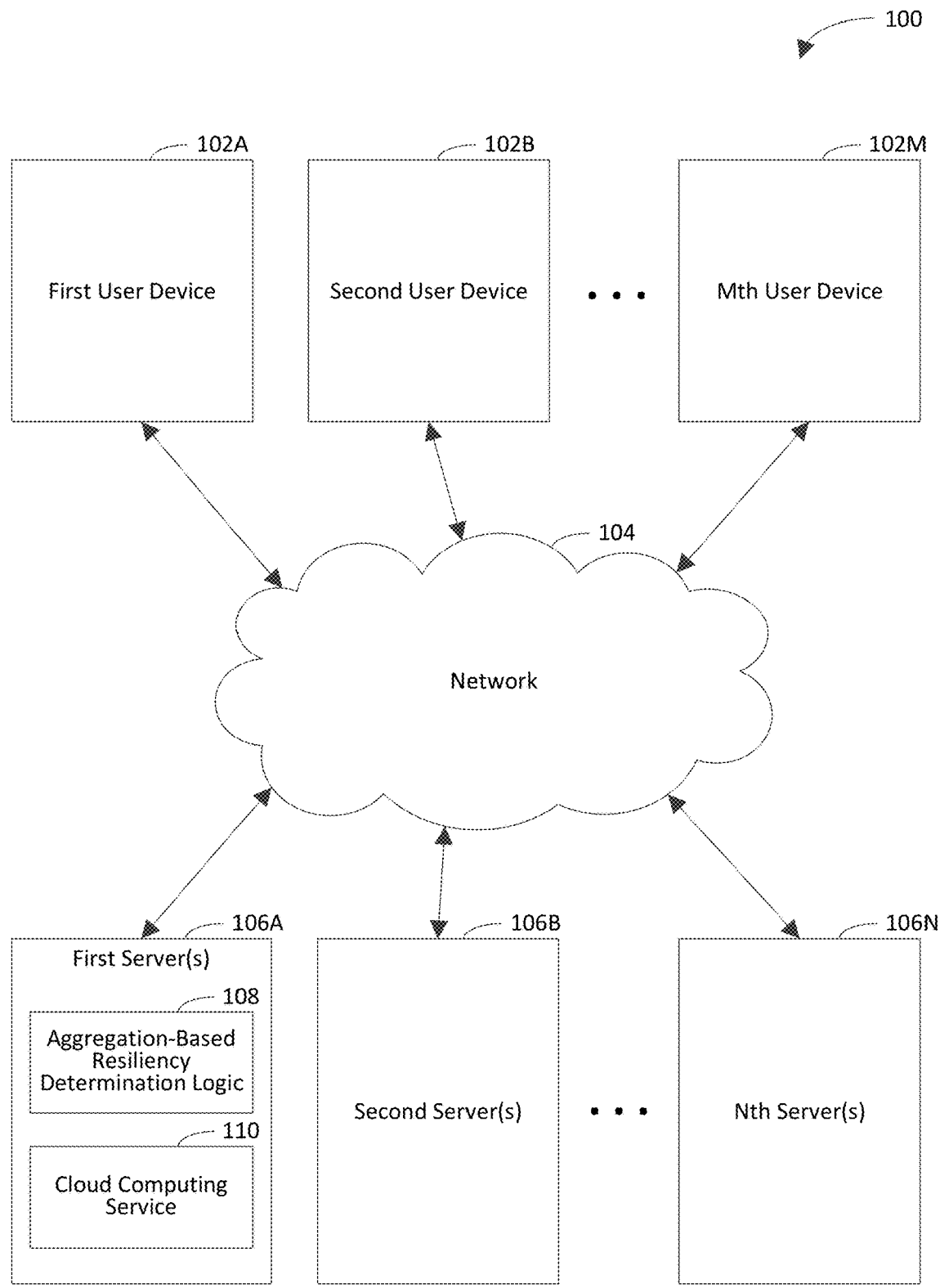
FIG. 1 is a block diagram of an example aggregation-based resiliency determination system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of performing an aggregation-based determination of resiliency of a cloud computing service to chaos events. A chaos event is an event that applies stress on operational performance of a cloud computing service. For instance, the chaos event may be configured to reduce a quality of service of the cloud computing service. A chaos event may be a synthetic event or an organic event. A synthetic event is a chaos event that is planned by a user (e.g., administrator or third-party) of a cloud computing service to be executed against the cloud computing service. For instance, the synthetic event may be purposefully or intentionally imposed on the cloud computing service. An organic event is a chaos event that is not planned by a user of a cloud computing service to be executed against the cloud computing service. For example, the organic event may occur in the ordinary course of execution (e.g., under ordinary operating conditions).

A cloud computing service is capable of measuring its performance during execution of a chaos event. For instance, the cloud computing service may generate indicators that represent measurements of the performance of the cloud computing service with regard to respective attributes of the cloud computing service. Examples of an attribute of a cloud computing service include but are not limited to a response time, latency, success rate, availability, error rate, traffic volume, requests per second (RPS), and operations per second (OPS) of the cloud computing service. An operation is a unit of work (e.g., request or job) that is performed by the cloud computing service. The measurements of the performance of the cloud computing service and the corresponding indicators that are generated by the cloud computing service may indicate changes in an operational health of the cloud computing service. For instance, the operational health of the cloud computing service may be dictated by how closely the measurements align with predefined targets. Operational health of a cloud computing service indicates an extent to which one or more technical issues negatively impact (e.g., degrade or disrupt) operation of the cloud computing service. Examples of the operation of the cloud computing service being degraded include but are not limited to the cloud computing service performing more slowly than usual (e.g., more slowly than a threshold rate), the operation of the cloud computing service being intermittently interrupted, and a feature (e.g., functionality) of the cloud computing service not working (e.g., within a threshold tolerance or at all). The operation of the cloud computing service is disrupted when one or more technical issues inhibit (e.g., prevent) one or more (e.g., all) users of the cloud computing service from accessing the cloud computing service.

The cloud computing service may measure its performance and generate such indicators for each of multiple time periods. The cloud computing service may generate a service health index (SHI) for each time period, indicating an extent to which the indicators for that time period satisfy respective criteria (e.g., fall within specified thresholds). The cloud computing device may generate a resiliency score based on (e.g., based at least in part on) the SHIs for the respective time periods (e.g., by performing a mathematical operation on the SHIs). The cloud computing service may generate resiliency scores for multiple chaos events in the same manner discussed above. The cloud computing service may then aggregate at least some of the resiliency scores to generate an aggregated resiliency score that represents resiliency of the cloud computing service to the chaos events.

Example techniques described herein have a variety of benefits as compared to conventional techniques for determining resiliency of a cloud computing service to chaos events. For instance, the example techniques may be capable of automatically measuring the effects of the chaos events on the cloud computing service. The example techniques may be capable of automatically and quantifiably assessing the resiliency of the cloud computing service over time, for example, by measuring the effects of the chaos events at various time intervals. The example techniques may be capable of analyzing an impact of system changes on the resiliency of the cloud computing service, validate such changes, and inhibit (e.g., prevent) regression for resiliency outcomes. The example techniques may be transparent and guide users of the cloud computing service toward increasing resiliency and maturity of the cloud computing service with clear and actionable feedback loops. The example techniques may be capable of comparing resiliency across multiple cloud computing services to facilitate conversations with management and dependencies of those cloud computing services.

The example techniques may simplify a determination of resiliency of a cloud computing service to chaos events by eliminating manual operations that characterize many conventional resiliency determination techniques. For instance, drills and gamedays, which often characterize conventional resiliency determination techniques, usually take several days of manual effort over multiple team members to assess the overall impact and resiliency of the services involved. By automating measurement of the effects of the chaos events on the cloud computing service, the example techniques may eliminate the need for a user to manually determine such effects. The example techniques may increase accuracy and/or precision of a determination of the resiliency of the cloud computing service by reducing a number of errors, such as those that are attributable to manual (i.e., human) intervention in the resiliency determination process. For instance, the example techniques may eliminate human error in the resiliency determination process. The example techniques may be driven entirely by policy and configuration, rather than by human action.

The example techniques may reduce an amount of time and/or resources (e.g., processor cycles, memory, network bandwidth) that is consumed to determine resiliency of a cloud computing service. For instance, by automatically measuring the effects of chaos events on the cloud computing service, the time and resources associated with manually determining such effects may be avoided. The example techniques may thereby reduce a cost associated with determining the resiliency of the cloud computing service, for example, by not incurring a cost that is attributable to each such manual determination. The example techniques may increase efficiency of a computing system that executes the cloud computing service, for example, by providing alerts when the resiliency of the cloud computing service decreases (e.g., falls below a threshold level) and performing (e.g., automatically performing) remedial operations that increase the resiliency of the cloud computing service.

The example techniques may increase efficiency of a user of a cloud computing service, for example, by automatically measuring the reaction of the cloud computing service to chaos events, notifying the user of reductions in the resiliency of the cloud computing service, and performing remedial operations that increase the resiliency of the cloud computing service. For example, by performing an aggregation-based determination of resiliency of a cloud computing service in accordance with one or more of the example techniques described herein, a reduction in quality of service of the cloud computing service may be mitigated (e.g., avoided). By mitigating the reduction in the quality of service of the cloud computing service, consumption of time and/or resources associated with recovering from chaos events may be avoided, and downtime of the user may be reduced.

FIG. 1 is a block diagram of an example aggregation-based resiliency determination system 100 in accordance with an embodiment. Generally speaking, the aggregation-based resiliency determination system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the aggregation-based resiliency determination system 100 performs an aggregation-based determination of resiliency of a cloud computing service 110 to chaos events. Detail regarding techniques for performing an aggregation-based determination of resiliency of a cloud computing service is provided in the following discussion.

As shown in FIG. 1, the aggregation-based resiliency determination system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service (e.g., cloud computing service 110). In accordance with some example embodiments, the servers 106A-106N are configured to host respective Web sites, so that the Web sites are accessible to users of the aggregation-based resiliency determination system 100.

The first server(s) 106A are shown to include aggregation-based resiliency determination logic 108 and the cloud computing service 110 for illustrative purposes. The cloud computing service 110 is a cloud-based service (e.g., software service) that is configured to provide shared computer system resources (e.g., computer processing and/or data storage) to one or more of the user devices 102A-102M on demand. The aggregation-based resiliency determination logic 108 is configured to perform an aggregation-based determination of resiliency of the cloud computing service 110 to chaos events. In an example implementation, the aggregation-based resiliency determination logic 108 discovers chaos events. The aggregation-based resiliency determination logic 108 executes the chaos events against the cloud computing service 110 during a time frame that includes multiple time periods. For each of the chaos events, the aggregation-based resiliency determination logic 108 analyzes a reaction of the cloud computing service 110 to execution of the respective chaos event by calculating service health indexes (SHIs) that correspond to the respective time periods. Each SHI indicates an extent to which indicators associated with the respective time period, satisfy respective criteria. The indicators associated with each time period represent respective measurements of performance of the cloud computing service 110 that are performed with regard to respective attributes of the cloud computing service 110 during the respective time period. For each of the chaos events, the aggregation-based resiliency determination logic 108 analyzes the SHIs for the respective chaos event to provide a respective resiliency score. The aggregation-based resiliency determination logic 108 aggregates at least some of the resiliency scores of the respective chaos events to provide an aggregated resiliency score, which represents the resiliency of the cloud computing service 110 to the chaos events.

The aggregation-based resiliency determination logic 108 may be implemented in various ways to perform an aggregation-based determination of resiliency of the cloud computing service 110 to chaos events, including being implemented in hardware, software, firmware, or any combination thereof. For example, the aggregation-based resiliency determination logic 108 may be implemented as computer program code configured to be executed in one or more processors. In another example, at least a portion of the aggregation-based resiliency determination logic 108 may be implemented as hardware logic/electrical circuitry. For instance, at least a portion of the aggregation-based resiliency determination logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The aggregation-based resiliency determination logic 108 is shown to be incorporated in the first server(s) 106A for illustrative purposes and is not intended to be limiting. It will be recognized that the aggregation-based resiliency determination logic 108 (or any portion(s) thereof) may be incorporated in any one or more of the user devices 102A-102M. For example, client-side aspects of the aggregation-based resiliency determination logic 108 may be incorporated in one or more of the user devices 102A-102M, and server-side aspects of aggregation-based resiliency determination logic 108 may be incorporated in the first server(s) 106A. In another example, the aggregation-based resiliency determination logic 108 may be distributed among the user devices 102A-102M. In yet another example, the aggregation-based resiliency determination logic 108 may be incorporated in a single one of the user devices 102A-102M. In another example, the aggregation-based resiliency determination logic 108 may be distributed among the server(s) 106A-106N. In still another example, the aggregation-based resiliency determination logic 108 may be incorporated in a single one of the servers 106A-106N.

The cloud computing service 110 is shown to be incorporated in the first server(s) 106A for illustrative purposes and is not intended to be limiting. It will be recognized that the cloud computing service 110 may be distributed among the server(s) 106A-106N. Moreover, the server(s) in which the aggregation-based resiliency determination logic 108 and the server(s) in which the cloud computing service 110 are incorporated may be same or different.

FIGS. 2-5 depict flowcharts 200, 300, 400, and 500 of example methods for performing aggregation-based determination of cloud computing service resiliency to chaos events in accordance with embodiments. Flowcharts 200, 300, 400, and 500 may be performed by the first server(s) 106A, shown in FIG. 1, for example. For illustrative purposes, flowcharts 200, 300, 400, and 500 are described with respect to computing system 600 shown in FIG. 6, which is an example implementation of the first server(s) 106A. As shown in FIG. 6, the computing system 600 includes aggregation-based resiliency determination logic 608 and store 610. The aggregation-based resiliency determination logic 608 includes discovery logic 612, execution logic 614, index calculation logic 616, index analysis logic 618, aggregation logic 620, alert logic 622, use determination logic 624, categorization logic 626, weight assignment logic 628, dependency determination logic 630, service inclusion logic 632, and causation logic 634. The store 610 may be any suitable type of store. One type of store is a database. For instance, the store 610 may be a relational database, an entity-relationship database, an object database, an object relational database, an extensible markup language (XML) database, etc. The store 610 is shown to store criteria 646, a usage threshold 648, a score threshold 650, and a maturity capability indicator 652 for non-limiting illustrative purposes. Further structural and operational embodiments will be apparent to persons skilled in the relevant art(s) based on the discussion regarding flowcharts 200, 300, 400, and 500.

Figure 2:
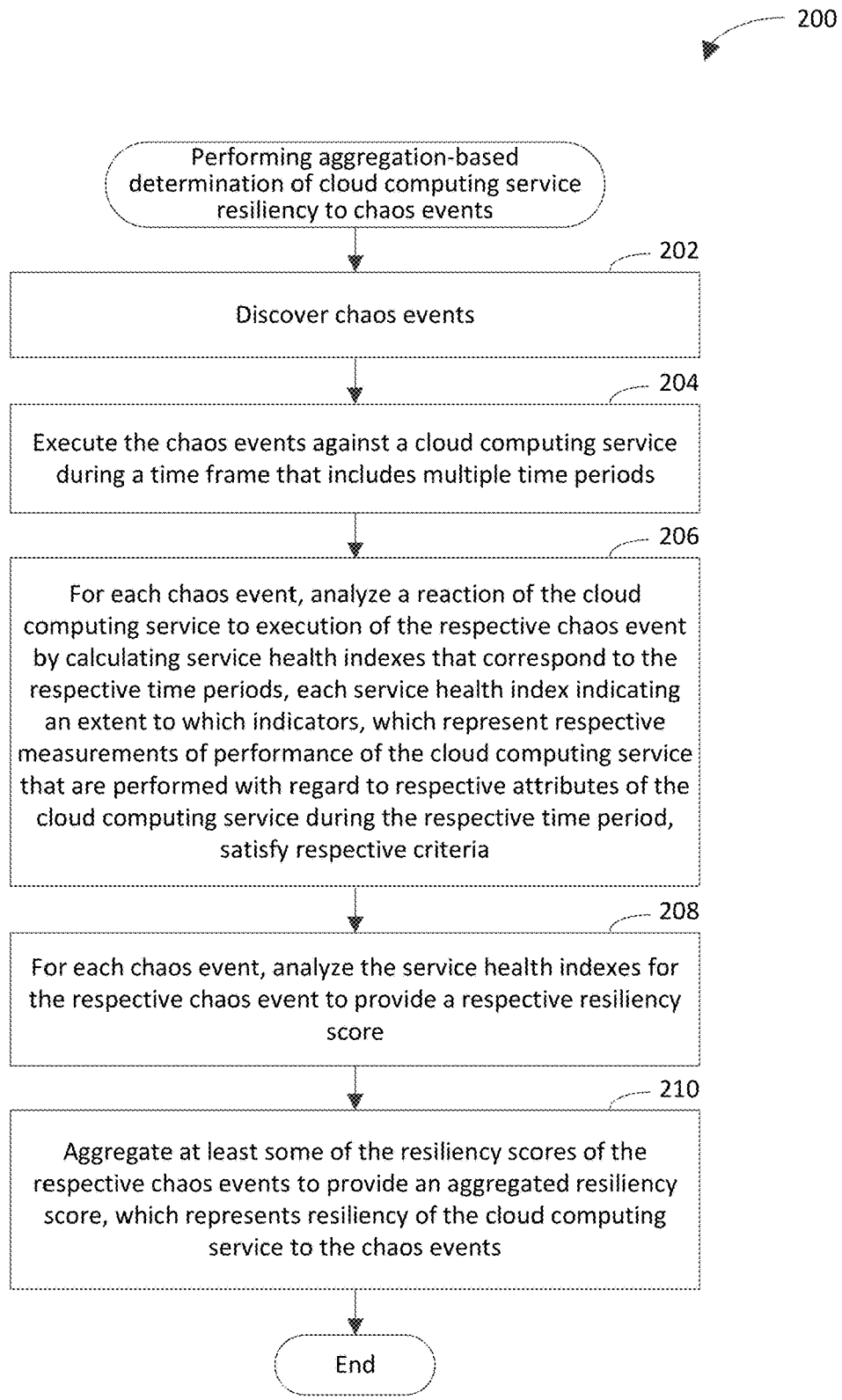
FIGS. 2-5 depict flowcharts of example methods for performing aggregation-based determination of cloud computing service resiliency to chaos events in accordance with embodiments.

As shown in FIG. 2, the method of flowchart 200 begins at step 202. In step 202, chaos events are discovered. For example, performance data indicating operational performance of any one or more cloud computing services may be analyzed to discover the chaos events. In accordance with this example, identifiable characteristics (e.g., patterns or sudden changes) in the performance data may indicate occurrence of the chaos events. In another example, information about the chaos event may be received from chaos engineering software that is external to the cloud computing service(s). Examples of a chaos event include but are not limited to loss of power (i.e., power outage), loss of network connectivity, loss of data center connectivity, loss of memory, overload or slowing down of a processor (e.g., central processing unit (CPU)), increased bandwidth consumption (e.g., reaching or exceeding a threshold), a natural disaster (e.g., flood, earthquake, hurricane, tornado), and human error. It will be recognized that some chaos events may include (e.g., cause) other chaos events. For instance, a natural disaster may cause a loss of network connectivity, a loss of memory, a slowing down of a processor, etc. In an example implementation, the discovery logic 612 discovers the chaos events. The discovery logic 612 may generate event identifiers 654 to identify (e.g., specify or describe) the respective chaos events.

At step 204, the chaos events are executed against a cloud computing service during a time frame that includes multiple time periods. For instance, the time periods may be consecutive time periods, non-overlapping time periods, or contiguous time periods. Any of a variety of parameters may be generated to define characteristics of each chaos event. Examples of a characteristic of a chaos event include but are not limited to a type of the chaos event (e.g., loss of power, loss of network connectivity, and so on), an intensity of the chaos event (e.g., an extent to which the chaos event negatively affects attribute(s) of the cloud computing service), a scope (a.k.a. blast radius) of the chaos event (e.g., a number of machines, regions, and/or zones affected by the chaos event), a timing of the chaos event, a frequency with which the chaos event is executed against the cloud computing service, a rate (e.g., speed) with which the chaos event takes effect (e.g., voltage drops to zero immediately or voltage slopes toward zero over time). A region is a geographic area (e.g., West US, West US2, East US). Each region includes multiple zones, and each zone corresponds to a respective data center.

In an example implementation, the execution logic 614 executes the chaos events against the cloud computing service during the time frame. For instance, the execution logic 614 may execute the chaos events against the cloud computing service in response to (e.g., based on) receipt of the event identifiers 654 (e.g., based on the event identifiers 654 indicating the chaos events). The execution logic 614 may generate indicators 638, which include indicators that represent respective measurements of performance of the cloud computing service that are performed with regard to respective attributes of the cloud computing service during each time period for each chaos event. The execution logic 614 may generate event timing information 656 to indicate (e.g., specify) the time periods for each chaos event. For instance, the event timing information 656 may correlate, for each chaos event, the indicators that represent the measurements performed during each time period with the respective time period. Accordingly, the event timing information 656 may enable, for each chaos event, the indicators for each time period to be cross-referenced with (e.g., mapped to) the respective time period.

At step 206, for each chaos event, a reaction of the cloud computing service to execution of the respective chaos event is analyzed by calculating service health indexes (SHIs) that correspond to the respective time periods. Each SHI indicates an extent to which indicators, which represent respective measurements of performance of the cloud computing service that are performed with regard to respective attributes of the cloud computing service during the respective time period, satisfy respective criteria. The indicators for each time period for each chaos event may be generated by the cloud computing service as a result of the respective chaos event being executed against the cloud computing service (e.g., as a result of the execution of the chaos event against the cloud computing service being initiated). For instance, the cloud computing service may measure its own performance during the time periods for each chaos event to generate the indicators for each time period. The attributes of the cloud computing service with regard to which the measurements are performed during each time period for each chaos event may include one or more of the following: response time, latency, success rate, availability, error rate, traffic volume, requests per second (RPS), and/or operations per second (OPS) of the cloud computing service. A criterion may indicate (e.g., include) a threshold. For instance, the criterion may indicate that the corresponding indicator is to be less than or equal to the threshold or that the corresponding indicator is to be greater than or equal to the threshold. When a criterion indicates that the corresponding indicator is to be less than or equal to the threshold, the threshold is referred to as a "maximum threshold." When a criterion indicates that the corresponding indicator is to be greater than or equal to the threshold, the threshold is referred to as a "minimum threshold."

In an example embodiment, at least one of the indicators is a service level indicator. For instance, all of the indicators may be service level indicators. A service level indicator is a measure of a service level provided by a provider of the cloud computing service to a user of the cloud computing service. The provider defines goals regarding operational performance of the cloud computing service. The service level indicates an extent to which those goals are to be achieved, as specified by a service level objective. Examples of a service level objective include but are not limited to availability, frequency, quality, response time, and throughput.

In an aspect of this embodiment, the indicators for each time period for each chaos event are service level indicators. In accordance with this aspect, each SHI indicates the extent to which the corresponding service level indicators satisfy the respective criteria that are defined by a service level objective that is associated with the cloud computing service.

In another aspect of this embodiment, a service level agreement is associated with the cloud computing service. The service level agreement describes the cloud computing service. For instance, the service level agreement may indicate how the cloud computing service is supported; times and/or locations at which the cloud computing service is available; costs associated with use of the cloud computing service; performance guarantees for the cloud computing service; and responsibilities of the provider and the users of the cloud computing service. Service level objects may be defined as internal performance goals, and the service level agreement may be an external performance contract with a customer of the cloud computing service. Performance thresholds defined in service level objects may be stricter than performance thresholds defined in the service level agreement. For example, the cloud computing service may have a service level object specifying that the service will maintain a success rate of 99.99%, and the service level agreement may guarantee a success rate of 99.9% to customers. In this manner, the cloud computing service may be configured to alert the customers on a service level objective violation to provide an opportunity to remediate the performance issue before it rises to a level that violates the corresponding service level agreement threshold.

In another example embodiment, analyzing the reaction of the cloud computing service for each chaos event at step 206 includes, for each chaos event, combining the indicators for each time period with respective weights to provide weighted indicators for the respective time period. The weights for each time period may be normalized, though the example embodiments are not limited in this respect. In accordance with this embodiment, for each chaos event, each SHI is calculated based at least in part on the weighted indicators (e.g., a sum of the weighted indicators) for the respective time period. For instance, the weight that is assigned to each indicator may be relatively lower if the indicator provides a relatively less precise indication of the operational health of the cloud computing service, and the weight may be relatively higher if the indicator provides a relatively more precise indication of the operational health of the cloud computing service.

In an aspect of this embodiment, weights are assigned to respective service level objectives. In accordance with this aspect, the indicators for each time period for each chaos event are service level indicators. In further accordance with this aspect, the weight assigned to each service level objective is assigned to each service level indicator that corresponds to the respective service level objective.

In another aspect of this embodiment, service level objectives are categorized among multiple categories such that each category includes one or more of the service level objectives. For instance, at least one (e.g., all) of the categories may include two or more of the service level objectives. In accordance with this aspect, weights are assigned to the respective categories. In further accordance with this aspect, the indicators for each time period for each chaos event are service level indicators. In further accordance with this aspect, the weight assigned to each category is assigned to each service level indicator that corresponds to a service level objective that is included in the respective category.

Each SHI may take into consideration any one or more of the indicators for the respective time period. For example, any one or more of the SHIs may be based on a combination of all of the indicators for the respective time period. In another example, any one or more of the SHIs may be based on a first subset of the indicators for the respective time period and not a second subset of the indicators for the respective time period. In accordance with this example, each indicator in the first subset may have a correlation to the operational health of the cloud computing service that is greater than or equal to a correlation threshold, and each indicator in the second subset may have a correlation to the operational health of the cloud computing service that is less than the correlation threshold. For instance, a first weight may be assigned to each indicator in the first subset, and a second weight may be assigned to each indicator in the second subset. For example, the first weight may be a positive, non-zero value, and the second weight may be zero.

In an example implementation, for each chaos event, the index calculation logic 616 analyzes the reaction of the cloud computing service by calculating the SHIs that correspond to the respective time periods. In accordance with this implementation, the index calculation logic 616 receives the indicators 638, which include the indicators for each time period for each chaos event. The index calculation logic 616 may analyze the event timing information 656 to determine which of the indicators 638 correspond to each time period for each chaos event. For instance, the index calculation logic 616 may make this determination by using the event timing information 656 to cross-reference, for each chaos event, the indicators for each time period with the respective time period. The index calculation logic 616 may compare the indicators for each time period of each chaos event to respective criteria and calculate the respective SHI based on (e.g., based at least in part on) the comparison. The criteria associated with each time period for each chaos event may be included among the criteria 646 stored by the store 610. For instance, the index calculation logic 616 may retrieve the criteria 646 from the store 610 for purposes of calculating the SHIs that correspond to the respective time periods for each chaos event. The index calculation logic 616 may generate SHI information 658 to indicate the SHIs that correspond to the respective time periods for each chaos event. For instance, the SHI information 658 may include the SHIs for each chaos event or pointers to the SHIs.

The index calculation logic 616 may calculate the SHIs that correspond to the respective time periods for each chaos event in any of a variety of ways. For example, the index calculation logic 616 may generate an intermediate value to represent each indicator. Each intermediate value may be a binary value or a non-binary value. In accordance with this example, the index calculation logic 616 may generate each binary value to be a first value (e.g., "1") if the indicator represented by the binary value satisfies the respective criterion and generate the binary value to be a second value (e.g., "0") if the indicator does not satisfy the respective criterion. In further accordance with this example, the index calculation logic 616 may generate each non-binary value to represent a magnitude of a difference between the indicator represented by the non-binary value and the respective criterion and further to indicate whether the indicator exceeds the respective criterion. In an aspect of this example, a non-binary value may be equal to a ratio of the indicator represented by the non-binary value and the respective criterion. In accordance with this aspect, if the numerator of the ratio is the indicator represented by the non-binary value and the denominator of the ratio is the respective criterion, the non-binary value being less than one indicates that the indicator is less than the respective criterion, and the non-binary value being greater than one indicates that the indicator is greater than the respective criterion. In further accordance with this aspect, if the denominator of the ratio is the indicator represented by the non-binary value and the numerator of the ratio is the respective criterion, the non-binary value being less than one indicates that the indicator is greater than the respective criterion, and the non-binary value being greater than one indicates that the indicator is less than the respective criterion. In further accordance with this example, the index calculation logic 616 may calculate the SHI that corresponds to each time period for each chaos event by combining the intermediate values that represent the respective indicators for the respective time period and/or performing a mathematical operation with regard to (e.g., on) those intermediate values. Performing a mathematical operation with regard to the intermediate values that represent the respective indicators for a time period may include adding (i.e. summing) those intermediate values. The intermediate values may be weighted or non-weighted, depending on any of a variety of factors. Each weight may represent an extent to which the indicator represented by the respective intermediate value correlates to the operational health of the cloud computing service. In an example, an intermediate value may be weighted based on the indicator represented by the intermediate value having a correlation to the operational health of the cloud computing service that is greater than or equal to a correlation threshold. In accordance with this example, an intermediate value may be non-weighted based on the indicator represented by the intermediate value having a correlation to the operational health of the cloud computing service that is less than the correlation threshold.

At step 208, for each chaos event, the SHIs for the respective chaos event are analyzed (e.g., aggregated) to provide a respective resiliency score. Analyzing the SHIs for each chaos event may include performing a mathematical operation with regard to (e.g., on) the SHIs for each chaos event. In accordance with this example, performing the mathematical operation with regard to the SHIs for each chaos event may include computing an average (i.e., mean), median, minimum, maximum, or designated percentile (e.g., 95th, 97th, 98th, or 99th percentile) of the SHIs for the respective chaos event. In an example implementation, the index analysis logic 618 analyzes the SHIs for each chaos event, as indicated by the SHI information 658, to provide the respective resiliency score, which is included among the resiliency scores 660. For instance, the index analysis logic 618 may obtain the SHIs from the SHI information 658 or from locations indicated by pointers in the SHI information 658.

In an example embodiment, analyzing the SHIs for each chaos event to provide the respective resiliency score at step 208 is performed based at least in part on a maturity of the respective chaos event being less than or equal to a maturity capability of the cloud computing service. The maturity of each chaos event indicates a severity of the respective chaos event based at least in part on a scope, intensity, and/or duration of the respective chaos event. The scope of each chaos event indicates a number of machines for which operational performance is reduced by the respective chaos event. The intensity of each chaos event indicates an extent to which the operational performance of at least one machine is reduced by the respective chaos event. The duration of each chaos event indicates an amount of time over which the respective chaos event occurs. The maturity capability of the cloud computing service indicates a severity of chaos events from which the cloud computing service is capable of recovering.

The severity of a chaos event may be based on any of a variety of factors, including but not limited to an intensity of the chaos event, a scope of the chaos event, and/or a frequency of the chaos event. In an example, the maturity capability of the cloud computing service may indicate a greatest severity of chaos events from which the cloud computing service has a demonstrated ability to recover (e.g., from which the cloud computing service has previously recovered). Recovery of the cloud computing service from a chaos event may be based on any of a variety of factors. For example, the recovery of the cloud computing service from a chaos event may be characterized by the operational health of the cloud computing service increasing above a specified threshold during or following the chaos event.

In an example implementation, the execution logic 614 generates maturity information 636, which indicates the maturity of each chaos event. In accordance with this implementation, the maturity capability indicator 652, which is stored by the store 610, indicates the maturity capability of the cloud computing service. In further accordance with this implementation, the index analysis logic 618 compares the maturity of each chaos event, as indicated by the maturity information 636, and the maturity capability indicator 652, which may be retrieved from the store 610, to determine whether the maturity of each chaos event is less than or equal to the maturity capability of the cloud computing service. In further accordance with this implementation, the index analysis logic 618 analyzes the SHIs for each chaos event, which are indicated by the SHI information 658, to provide the respective resiliency score based at least in part on the maturity of the respective chaos event being less than or equal to the maturity capability of the cloud computing service.

At step 210, at least some (e.g., all or fewer than all) of the resiliency scores of the respective chaos events are aggregated to provide an aggregated resiliency score, which represents resiliency of the cloud computing service to the chaos events. Upon completion of step 210, the method of flowchart 200 ends. In an example implementation, the aggregation logic 620 aggregates at least some (e.g., two or more) of the resiliency scores 660 of the respective chaos events to provide the aggregated resiliency score, which is included among the aggregated resiliency score(s) 662.

In an example embodiment, aggregating at least some of the resiliency scores of the respective chaos events at step 210 includes calculating an average of the resiliency scores of the respective chaos events. In accordance with this embodiment, aggregating at least some of the resiliency scores of the respective chaos events at step 210 further includes generating the aggregated resiliency score to include a ratio of the average of the resiliency scores of the respective chaos events to a target resiliency score.

In another example embodiment, the resiliency score for at least one (e.g., each) of the chaos events is based at least in part on a time to recover from the respective chaos event. A time to recover from a chaos event is an amount of time that is consumed or expected to be consumed to recover from the chaos event. In accordance with this embodiment, a relatively lower time to recover has a positive (e.g., increasing) effect on the resiliency score, and a relatively higher time to recover has a negative (e.g., reducing) effect on the resiliency score.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, analyzing the reaction of the cloud computing service for each chaos event at step 206 includes, for each chaos event, combining the SHIs with respective weights to provide weighted SHIs. For instance, the weighted SHIs for each chaos event may be generated by multiplying the SHIs by the respective weights for the respective chaos event. Each weight may represent an extent to which the corresponding SHI correlates to the operational health of the cloud computing service. The weights that are combined with the SHIs for each chaos event may be normalized, though the example embodiments are not limited in this respect. In an example implementation, for each chaos event, the index calculation logic 616 combines the SHIs with respective weights, which are included among weights 668, to provide the weighted SHIs. In accordance with this embodiment, analyzing the SHIs for each chaos event at step 208 includes, for each chaos event, analyzing the weighted SHIs for the respective chaos event to provide the respective resiliency score. For example, analyzing the SHIs for each chaos event at step 208 may include, for each chaos event, summing the weighted SHIs to provide a cumulative weighted SHI. In accordance with this example, analyzing the SHIs for each chaos event at step 208 may further include, for each chaos event, dividing the cumulative weighted SHI by a sum of the weights to provide the respective resiliency score. In an example implementation, the index analysis logic 618 analyzes the weighted SHIs for each chaos event to provide the respective resiliency score.

In an aspect of this embodiment, the method of flowchart 200 further includes determining an extent to which the cloud computing service is used during each of the time periods. In an example implementation, use determination logic 624 determines the extent to which the cloud computing service is used during each of the time periods. In accordance with this implementation, the use determination logic 624 analyzes usage information 640, which indicates the extent to which the cloud computing service is used during each time period, to make the determination. For instance, the use determination logic 624 may receive the usage information 640 from the cloud computing service. In accordance with this aspect, the method of flowchart 200 further includes establishing the weights to represent (e.g., indicate or correspond to) the respective extents to which the cloud computing service is used during the respective time periods. For instance, a relatively greater extent corresponds to a relatively greater weight, and a relatively lower extent corresponds to a relatively lower weight. In an example implementation, the use determination logic 624 establishes the weights 666 to represent the respective extents to which the cloud computing service is used during the respective time periods.

In another example embodiment, the method of flowchart 200 further includes determining an extent to which the cloud computing service is used during each of the time periods. In an example implementation, the use determination logic 624 determines the extent to which the cloud computing service is used during each of the time periods (e.g., based on the usage information 640 indicating the respective extents). In accordance with this embodiment, the method of flowchart 200 further includes comparing the extent to which the cloud computing service is used during each of the time periods to a usage threshold. In an example implementation, the use determination logic 624 compares the extent to which the cloud computing service is used during each of the time periods to a usage threshold 648. For instance, the use determination logic 624 may retrieve the usage threshold 648 from the store 610 for purposes of comparing the extent to the usage threshold 648. The use determination logic 624 may generate comparison information 676 as a result of the comparison to indicate whether each SHI is greater than or equal to the usage threshold 648. In accordance with this embodiment, analyzing the SHIs for each chaos event at step 208 includes, for each chaos event, taking a first subset of the SHIs for the respective chaos event into consideration and not taking a second subset of the SHIs for the respective chaos event into consideration to provide the respective resiliency score. Each first subset includes each SHI for the respective chaos event that corresponds to a time period during which the extent to which the cloud computing service is used is greater than or equal to the usage threshold. Each second subset includes each SHI for the respective chaos event that corresponds to a time period during which the extent to which the cloud computing service is used is less than the usage threshold. In an example implementation, for each chaos event, the index analysis logic 618 takes the first subset of the SHIs for the respective chaos event and not the second subset of the SHIs for the respective chaos event into consideration to provide the respective resiliency score based on the comparison information 676 (e.g., based on the comparison information 676 indicating whether each of the SHIs for the respective chaos event is greater than or equal to the usage threshold 648).

In yet another example embodiment, the method of flowchart 200 further includes selecting a duration of each of the time periods for each chaos event based on a duration of the respective chaos event. For example, a chaos event having a relatively long duration may result in a relatively longer duration being selected for each of the time periods for the chaos event. In another example, a chaos event having a relatively short duration may result in a relatively shorter duration being selected for each of the time periods for the chaos event. It will be recognized that the duration of each of the time periods for a chaos event may establish a sampling rate for performing the measurements of the performance of the cloud computing service for the time periods. The duration may be any suitable value, including but not limited to one minute or five minutes. In an example implementation, the execution logic 614 selects the duration of each of the time periods for each chaos event based on the duration of the respective chaos event. For example, the event identifiers 654 may indicate the respective durations of the respective chaos events. In accordance with this example, the execution logic 614 may analyze the event identifiers 654 to determine the duration of each chaos event.

In still another example embodiment, the method of flowchart 200 further includes comparing the aggregated resiliency score to a score threshold to determine whether the aggregated resiliency score is less than the score threshold. In an example implementation, the alert logic 622 compares the aggregated resiliency score, which is included among the aggregated resiliency score(s) 662, to a score threshold 650 to determine whether the aggregated resiliency score is less than the score threshold 650. For instance, the alert logic 622 may retrieve the score threshold 650 from the store 610 to make the comparison. In accordance with this embodiment, the method of flowchart 200 further includes providing an alert to a provider of the cloud computing service based on a determination that the aggregated resiliency score is less than the score threshold. The alert indicates that the aggregated resiliency score is less than the score threshold. In an example implementation, the alert logic 622 provides an alert 664 to the provider of the cloud computing service, indicating that the aggregated resiliency score is less than the score threshold 650, based on a determination that the aggregated resiliency score is less than the score threshold 650.

Figure 3:
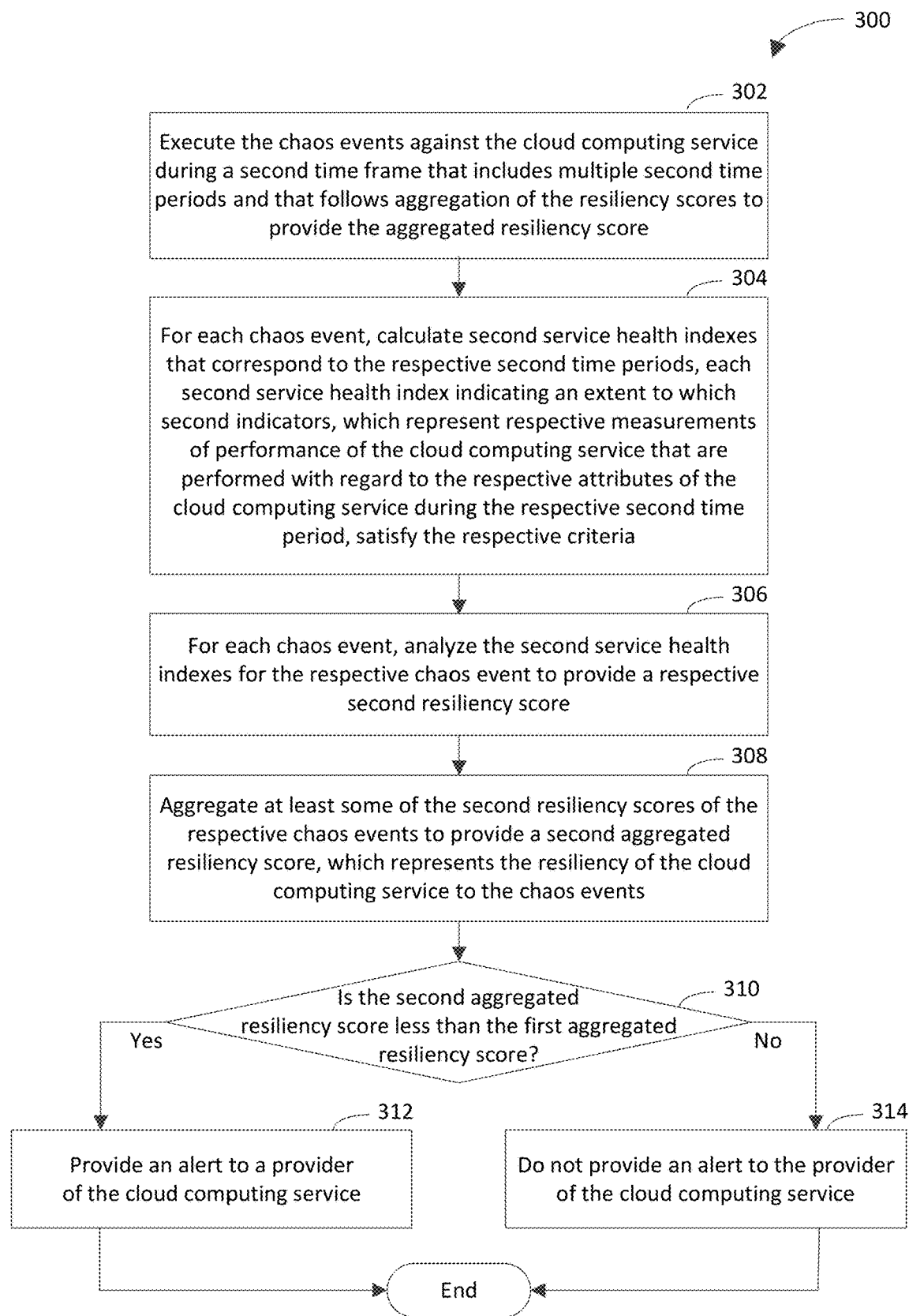

In another example embodiment, the method of flowchart 200 further includes one or more of the steps shown in flowchart 300 of FIG. 3. As shown in FIG. 3, the method of flowchart 300 begins at step 302. In step 302, the chaos events are executed against the cloud computing service during a second time frame that includes multiple second time periods and that follows aggregation of the resiliency scores to provide the aggregated resiliency score. In an example implementation, the execution logic 614 executes the chaos events against the cloud computing service during the second time frame, which includes the second time periods and which follows the aggregation of the resiliency scores 660 to provide the aggregated resiliency score. The execution logic 614 may generate indicators 638, which include second indicators that represent respective measurements of performance of the cloud computing service that are performed with regard to respective attributes of the cloud computing service during each second time period for each chaos event. The execution logic 614 may generate the event timing information 656 to indicate the second time periods for each chaos event. For instance, the event timing information 656 may correlate, for each chaos event, the second indicators for each second time period with the respective second time period. Accordingly, the event timing information 656 may enable, for each chaos event, the second indicators for each second time period to be cross-referenced with the respective second time period.

At step 304, for each chaos event, second SHIs that correspond to the respective second time periods are calculated. Each second SHI indicates an extent to which second indicators, which represent respective measurements of performance of the cloud computing service that are performed with regard to the respective attributes of the cloud computing service during the respective second time period, satisfy the respective criteria. In an example implementation, for each chaos event, the index calculation logic 616 calculates the second SHIs, which correspond to the respective second time periods. In accordance with this implementation, the index calculation logic 616 receives the indicators 638, which include the second indicators for each second time period for each chaos event. The index calculation logic 616 may analyze the event timing information 656 to determine which of the indicators 638 correspond to each second time period for each chaos event. For instance, the index calculation logic 616 may make this determination by using the event timing information 656 to cross-reference, for each chaos event, the second indicators for each time period with the respective second time period. The index calculation logic 616 may compare the second indicators for each time period of each chaos event to respective criteria and calculate the respective second SHI based on the comparison. The criteria associated with each second time period for each chaos event may be included among the criteria 646 stored by the store 610. The SHI information 658 generated by the index calculation logic 616 may indicate the second SHIs that correspond to the respective second time periods for each chaos event.

At step 306, for each chaos event, the second SHIs for the respective chaos event are analyzed to provide a respective second resiliency score. In an example implementation, the index analysis logic 618 analyzes the second SHIs for each chaos event, as indicated by the SHI information 658, to provide the respective second resiliency score, which is included among the resiliency scores 660.

At step 308, at least some of the second resiliency scores of the respective chaos events are aggregated to provide a second aggregated resiliency score, which represents the resiliency of the cloud computing service to the chaos events. In an example implementation, the aggregation logic 620 aggregates at least some (e.g., two or more) of the second resiliency scores of the respective chaos events to provide the second aggregated resiliency score, which is included among the aggregated resiliency score(s) 662.

At step 310, a determination is made whether the second aggregated resiliency score is less than the first aggregated resiliency score. If the second aggregated resiliency score is less than the first aggregated resiliency score, flow continues to step 312. Otherwise, flow continues to step 314. In an example implementation, the alert logic 622 determines whether the second aggregated resiliency score is less than the first aggregated resiliency score. For instance, the alert logic 622 may review (e.g., analyze) the aggregated resiliency score(s) 662 to identify the first and second aggregated resiliency scores.

At step 312, an alert is provided to a provider of the cloud computing service. The alert indicates that the second aggregated resiliency score is less than the first aggregated resiliency score. For instance, the alert may indicate regression of the resiliency of the cloud computing service to the chaos events (e.g., over time). Upon completion of step 312, the method of flowchart 300 ends. In an example implementation, the alert logic 622 provides the alert 664 to the provider of the cloud computing service, indicating that the second aggregated resiliency score is less than the first aggregated resiliency score.

At step 314, an alert is not provided to the provider of the cloud computing service. Upon completion of step 314, the method of flowchart 300 ends. In an example implementation, the alert logic 622 does not provide the alert 664 to the provider of the cloud computing service.

Figure 4:
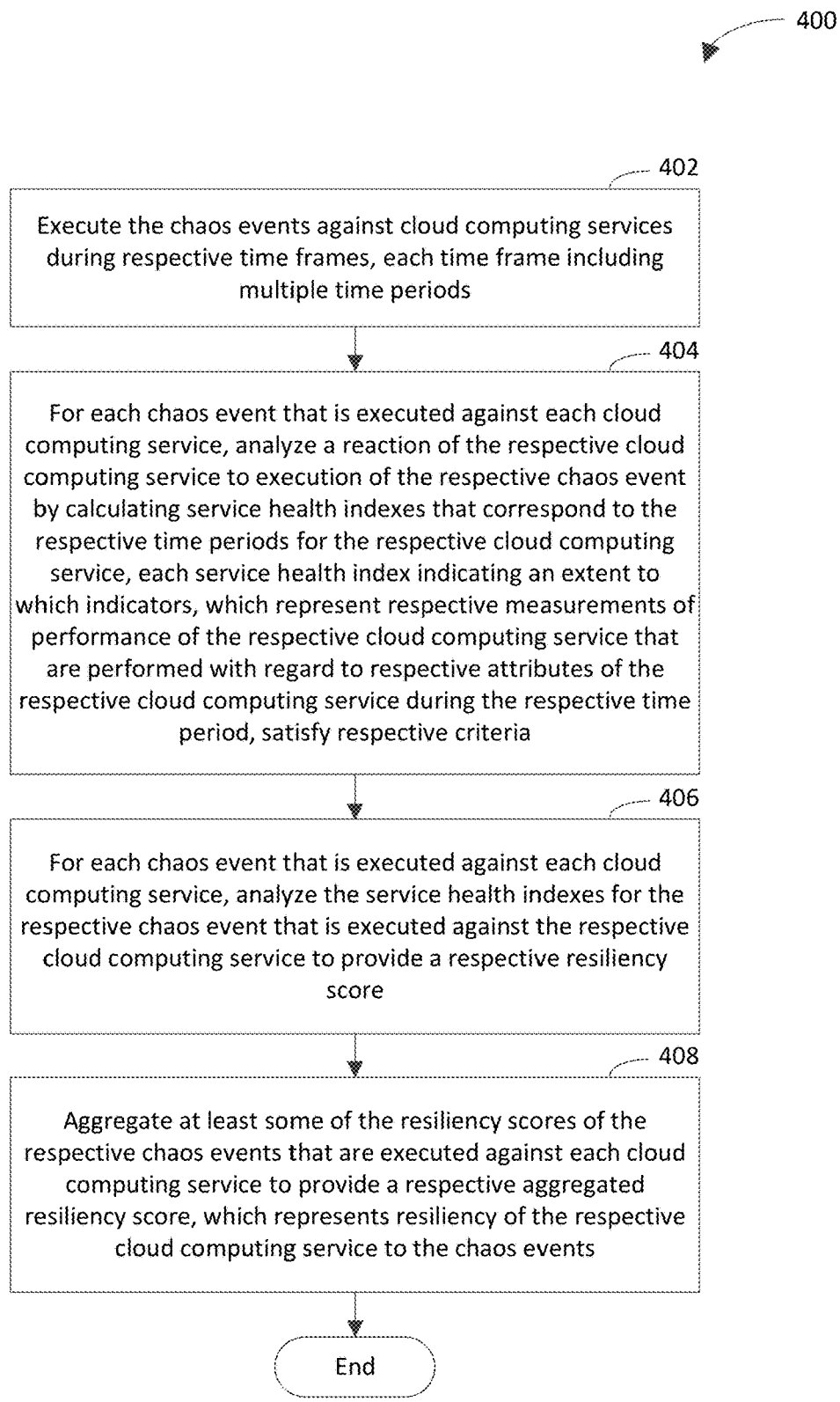

In yet another example embodiment, the chaos events may be executed against multiple cloud computing services. Accordingly, steps 204, 206, 208, and 210 of flowchart 200 may be replaced with respective steps 402, 404, 406, and 408 of flowchart 400 of FIG. 4. As shown in FIG. 4, the method of flowchart 400 begins at step 402. In step 402, the chaos events are executed against cloud computing services during respective time frames. The time frame for each cloud computing service may not overlap with a time frame for any other cloud computing service, though the example embodiments are not limited in this respect. For instance, the time from for each cloud computing service may overlap with one or more time frames for one or more other cloud computing services. Each time frame includes multiple time periods. In an example implementation, the execution logic 614 executes the chaos events against the cloud computing services during the respective time frames.

At step 404, for each chaos event that is executed against each cloud computing service, a reaction of the respective cloud computing service to execution of the respective chaos event is analyzed by calculating SHIs that correspond to the respective time periods for the respective cloud computing service. Each SHI indicates an extent to which indicators, which represent respective measurements of performance of the respective cloud computing service that are performed with regard to respective attributes of the respective cloud computing service during the respective time period, satisfy respective criteria. In an example implementation, for each chaos event that is executed against each cloud computing service, the index calculation logic 616 analyzes a reaction of the respective cloud computing service to execution of the respective chaos event by calculating SHIs that correspond to the respective time periods for the respective cloud computing service.

At step 406, for each chaos event that is executed against each cloud computing service, the SHIs for the respective chaos event that is executed against the respective cloud computing service is analyzed to provide a respective resiliency score. In an example implementation, for each chaos event that is executed against each cloud computing service, the index analysis logic 618 analyzes the SHIs for the respective chaos event that is executed against the respective cloud computing service to provide a respective resiliency score. For instance, the resiliency scores for the respective chaos events that are executed against each cloud computing service are included among the resiliency scores 660 generated by the index analysis logic 618.

At step 408, at least some of the resiliency scores of the respective chaos events that are executed against each cloud computing service are aggregated to provide a respective aggregated resiliency score, which represents resiliency of the respective cloud computing service to the chaos events. In an example implementation, the aggregation logic 620 aggregates at least some of the resiliency scores of the respective chaos events that are executed against each cloud computing service to provide a respective aggregated resiliency score.

In an aspect of the embodiment of FIG. 4, the method of flowchart 400 further includes determining that a specified cloud computing service depends on a dependent cloud computing service, which is included among the cloud computing services against which the chaos events are to be executed. In an example implementation, the dependency determination logic 630 determines that the specified cloud computing service depends on the dependent cloud computing service. The dependency determination logic 630 may generate dependency information 674 to indicate that the specified cloud computing service depends on the dependent cloud computing service. In accordance with this aspect, the method of flowchart 400 further includes adding the specified cloud computing service to the cloud computing services against which the chaos events are to be executed based at least in part on a determination that the specified cloud computing service depends on the dependent cloud computing service. In an example implementation, the service inclusion logic 632 adds the specified cloud computing service to the cloud computing services against which the chaos events are to be executed based on the dependency information 674 indicating that the specified cloud computing service depends on the dependent cloud computing service. The service inclusion logic 632 may generate service information 642 to indicate that the specified cloud computing service is included among (e.g., has been added to) the cloud computing services against which the chaos events are to be executed. In further accordance with this aspect, executing the chaos events against the cloud computing services at step 402 includes executing the chaos events against the specified cloud computing service based at least in part on the determination that the specified cloud computing service depends on the dependent cloud computing service. In an example implementation, the execution logic 614 executes the chaos events against the specified cloud computing service based on the service information 642 indicating that the specified cloud computing service is included among (e.g., has been added to) the cloud computing services against which the chaos events are to be executed. Recall that the specified cloud computing service is included among the cloud computing services against which the chaos events are to be executed based on the dependency information 674 indicating that the specified cloud computing service depends on the dependent cloud computing service.

In another aspect of the embodiment of FIG. 4, the method of flowchart 400 further includes determining that a first aggregated resiliency score of a first cloud computing service has a causal effect on a second aggregated resiliency score of a second cloud computing service. For example, determining that the first aggregated resiliency score has a causal effect on the second aggregated resiliency score may be based on a first time period with which a relatively low SHI of the first cloud computing service corresponds precedes (e.g., immediately precedes) or is the same as a second time period with which a relatively low SHI of the second cloud computing service corresponds. In another example, determining that the first aggregated resiliency score has a causal effect on the second aggregated resiliency score may be based on a pattern of first indicators corresponding to (e.g., sharing at least one characteristic with) a pattern of second indicators. The first indicators represent the respective measurements of the performance of the first cloud computing service that are performed with regard to the respective attributes of the first cloud computing service during the first time period. The second indicators represent the respective measurements of performance of the second cloud computing service that are performed with regard to the respective attributes of the second cloud computing service during the second time period.

In an example implementation of this aspect, the causation logic 634 determines that the first aggregated resiliency score of the first cloud computing service has a causal effect on the second aggregated resiliency score of the second cloud computing service. For example, the causation logic 634 may review the aggregated resiliency score(s) 662 to identify the first aggregated resiliency score and the second aggregated resiliency score. In accordance with this example, the causation logic 634 may determine that the first aggregated resiliency score has a causal effect on the second aggregated resiliency score based on a difference between the first aggregated resiliency score and the second aggregated resiliency score being less than a difference threshold. In another example, the causation logic 634 may review the SHI information 658 to determine that a first time period with which one or more relatively low SHIs of the first cloud computing service corresponds precedes or is the same as a second time period with which one or more relatively low SHIs of the second cloud computing service corresponds. In accordance with this example, the causation logic 634 may determine that the first aggregated resiliency score has a causal effect on the second aggregated resiliency score based on a determination that the first time period precedes or is the same as the second time period. In yet another example, the causation logic 634 may review the indicators 638 to determine a pattern of first indicators, which represent measurements of the performance of the first cloud computing service that are performed during a first time period, and a pattern of second indicators, which represent measurements of performance of the second cloud computing service that are performed during a second time period. In accordance with this example, the causation logic 634 may determine that the first aggregated resiliency score has a causal effect on the second aggregated resiliency score based on the pattern of first indicators corresponding to (e.g., sharing at least one characteristic with) the pattern of second indicators. In still another example, the causation logic 634 may review the SHI information 658 to determine a first pattern of SHIs that correspond to the respective time periods for one or more chaos events for a first cloud computing service and to further determine a second pattern of SHIs that correspond to the respective time periods for one or more chaos events for a second cloud computing service. In accordance with this example, the causation logic 634 may determine that the first aggregated resiliency score has a causal effect on the second aggregated resiliency score based on the first pattern of SHIs corresponding to (e.g., sharing at least one characteristic with) the second pattern of SHIs. The causation logic 634 may generate causal effect information 644 to indicate that the first aggregated resiliency score of the first cloud computing service has a causal effect on the second aggregated resiliency score of the second cloud computing service.

In accordance with this aspect, the method of flowchart 400 further includes determining that the second cloud computing service depends on the first cloud computing service based on a determination that the first aggregated resiliency score has a causal effect on the second aggregated resiliency score. In an example implementation, the dependency determination logic 630 determines that the second cloud computing service depends on the first cloud computing service based on the causal effect information 644 indicating that the first aggregated resiliency score has a causal effect on the second aggregated resiliency score.

In yet another aspect of the embodiment of FIG. 4, the time frames are the same (e.g., coincident). In accordance with this aspect, the method of flowchart 400 further includes comparing the aggregated resiliency scores of the respective cloud computing services to identify a first aggregated resiliency score of a first cloud computing service that is less than the aggregated resiliency scores of the other cloud computing services. In an example implementation, the alert logic 622 compares the aggregated resiliency scores of the respective cloud computing services to discover that the first aggregated resiliency score of the first cloud computing service is less than the aggregated resiliency scores of the other cloud computing services. In further accordance with this aspect, the method of flowchart 400 further includes providing an alert to a provider of the first cloud computing service. The alert indicates that the first aggregated resiliency score of the first cloud computing service is less than the aggregated resiliency scores of the other cloud computing services. In an example implementation, the alert logic 622 provides the alert 664 to the provider of the first cloud computing service based on the first aggregated resiliency score of the first cloud computing service being less than the aggregated resiliency scores of the other cloud computing services. In accordance with this implementation, the alert 664 indicates that the first aggregated resiliency score of the first cloud computing service is less than the aggregated resiliency scores of the other cloud computing services.

Figure 5:
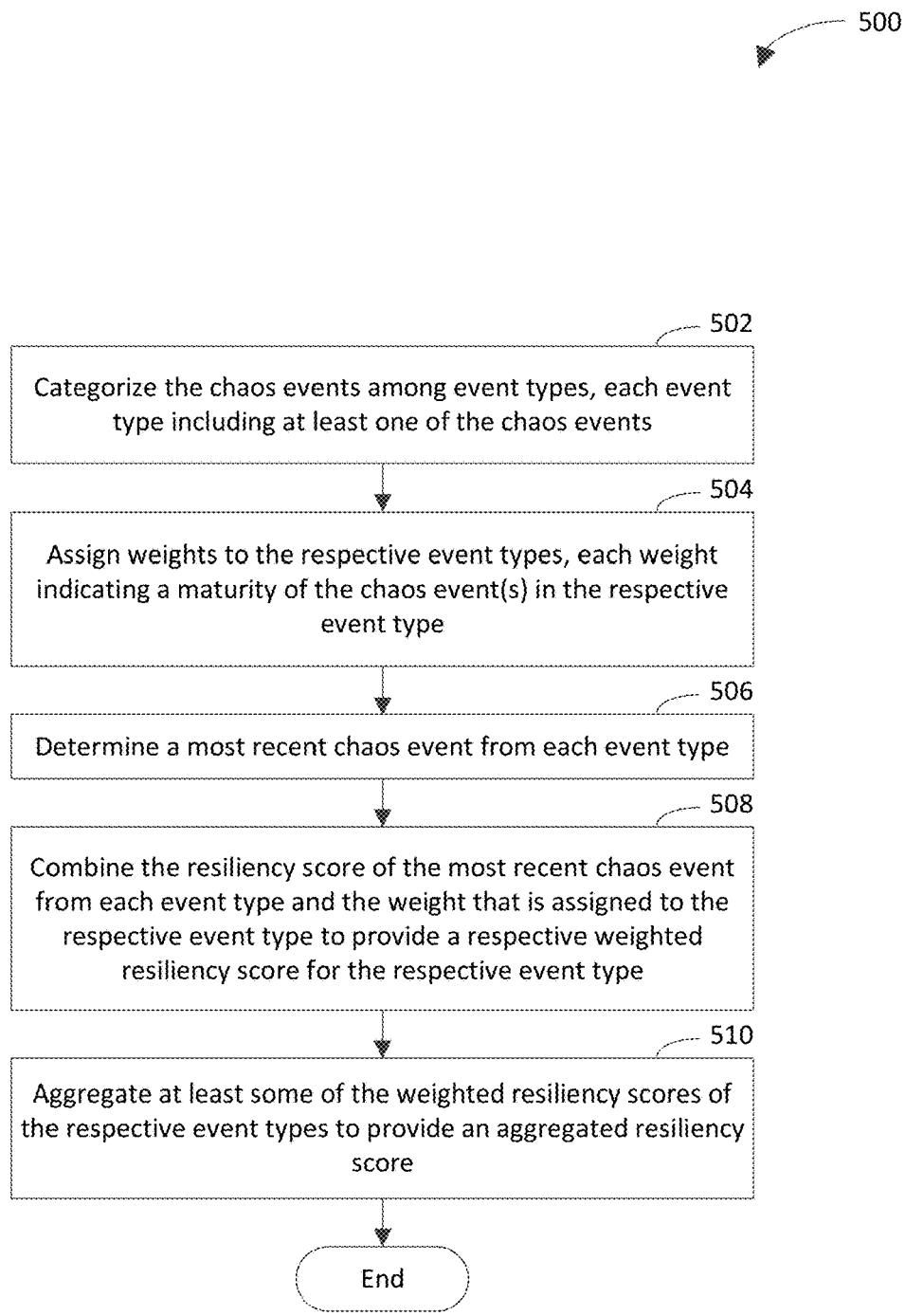
Figure 6:
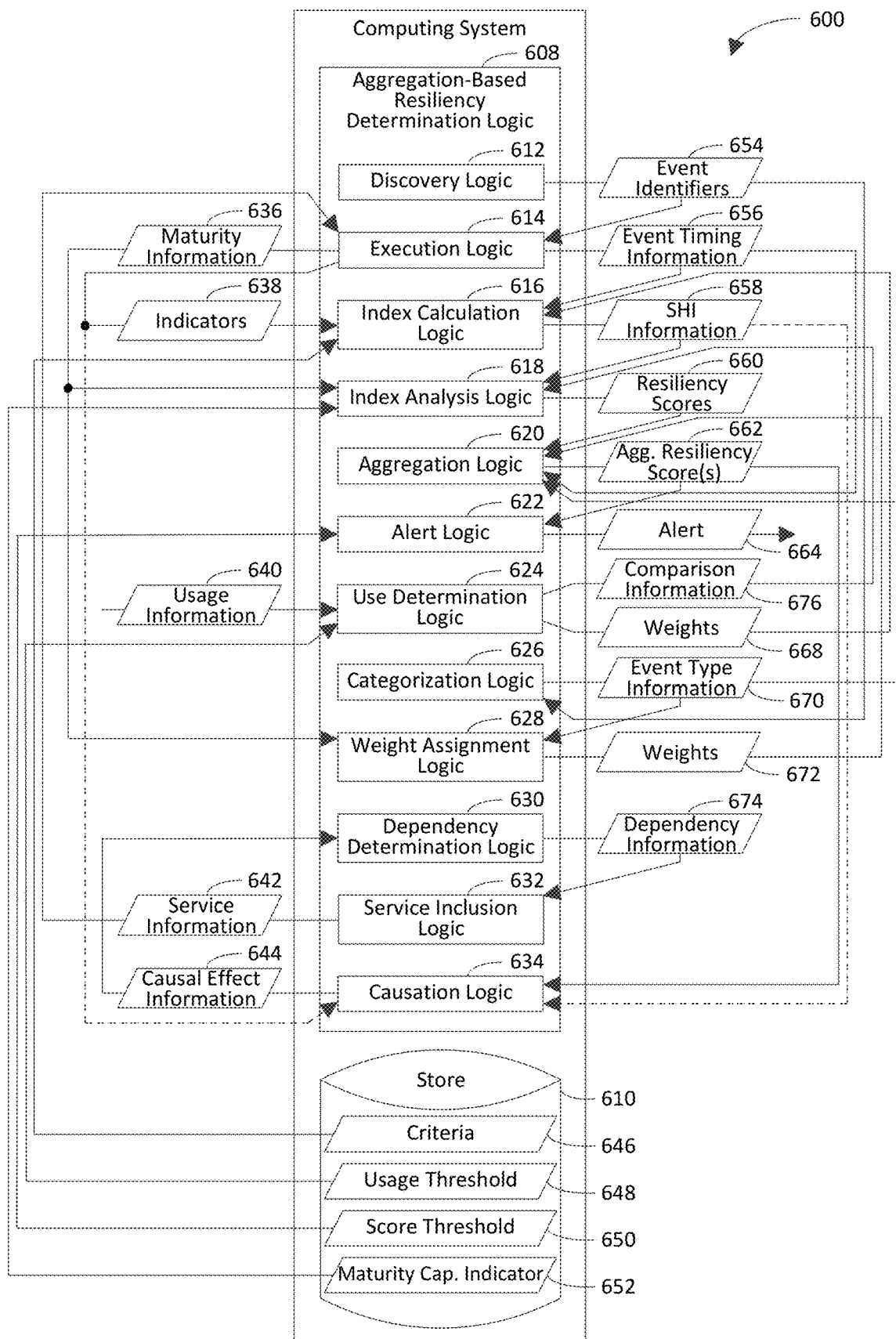
FIG. 6 is a block diagram of an example computing system in accordance with an embodiment.

In still another example embodiment, step 210 of flowchart 200 may be replaced with one or more of the steps shown in flowchart 500 of FIG. 5. As shown in FIG. 5, the method of flowchart 500 begins at step 502. In step 502, the chaos events are categorized among multiple event types such that each event type includes at least one of the chaos events. In an example implementation, categorization logic 626 categorizes the chaos events among the event types such that each event type includes one or more of the chaos events. For instance, the categorization logic 626 may identify each chaos event based on the event identifiers 654. The event identifiers 654 may include descriptive information that indicates (e.g., describes) characteristics of each chaos event. The categorization logic 626 may review the descriptive information to determine which of the chaos events are to be included in each event type. The categorization logic 626 may generate event type information 670 to indicate the event types and to further indicate which of the chaos events are included in each event type. For instance, the event type information 670 may cross-reference each event type with the chaos event(s) that are included in the respective event type.

At step 504, weights are assigned to the respective event types. Each weight indicates a maturity of the chaos event(s) in the respective event type. The maturity of the chaos event(s) in each event type indicate a severity of the chaos event(s) based on a scope (a.k.a. blast radius) of the chaos event(s), an intensity of the chaos event(s), and/or a duration of the chaos event(s). The scope of the chaos event(s) in each event type indicate a number of machines for which operational performance is reduced by the chaos event(s). The intensity of the chaos event(s) in each event type indicate an extent to which the operational performance of at least one machine is reduced by the chaos event(s). The duration of the chaos event(s) in each event type indicate an amount of time over which the chaos event(s) occur. The weights that are assigned to the respective event types may be normalized, though the example embodiments are not limited in this respect. In an example implementation, the weight assignment logic 628 assigns weights 672 to the respective event types based on the event type information 670 indicating the event types and further indicating which of the chaos events are included in each event type. In accordance with this implementation, the weight assignment logic 628 assigns the weights 672 further based on maturity information 636, which indicates a maturity of each chaos event. The weight assignment logic 628 may determine the maturity of the chaos event(s) in each event type to be equal to a highest (i.e., maximum) maturity among the maturities of the chaos events in the event type, an average of the maturities of the chaos events in the event type, a median of the maturities of the chaos events in the event type, or other value based on the maturities of the chaos events in the event type. In further accordance with this implementation, the weight assignment logic 628 may assign each of the weights 672 to the respective event type based on the maturity of the chaos event(s) in the respective event type.

At step 506, a most recent chaos event from each event type is determined. For instance, the most recent chaos event from each event type may be a most recently completed chaos event in the respective event type or a chaos event in the respective event type for which a resiliency score was most recently provided (e.g., determined). In an example implementation, the aggregation logic 620 determines the most recent chaos event from each event type. For example, the event timing information 656 may indicate a time at which each chaos event occurs and/or a time period over which each chaos event occurs. In accordance with this example, the aggregation logic 620 may analyze the event timing information 656 (e.g., by comparing the times and/or time periods associated with the respective chaos events) to determine the most recent chaos event from each event type.

At step 508, the resiliency score of the most recent chaos event from each event type and the weight that is assigned to the respective event type are combined (e.g., multiplied) to provide a respective weighted resiliency score for the respective event type. In an example implementation, the aggregation logic 620 combines the resiliency score of the most recent chaos event from each event type and the weight that is assigned to the respective event type to provide a respective weighted resiliency score for the respective event type. For instance, the aggregation logic 620 may cross-reference the most recent chaos event from each event type with the resiliency scores 660 to determine the resiliency score of the most recent chaos event from each event type.

At step 510, at least some (e.g., all) of the weighted resiliency scores of the respective event types are aggregated to provide an aggregated resiliency score. In an example implementation, the aggregation logic 620 aggregates at least some of the weighted resiliency scores of the respective event types to provide the aggregated resiliency score.

It will be recognized that the computing system 600 may not include one or more of the aggregation-based resiliency determination logic 608, the store 610, the discovery logic 612, the execution logic 614, the index calculation logic 616, the index analysis logic 618, the aggregation logic 620, the alert logic 622, use determination logic 624, the categorization logic 626, the weight assignment logic 628, the dependency determination logic 630, the service inclusion logic 632, and/or the causation logic 634. Furthermore, the computing system 600 may include components in addition to or in lieu of the aggregation-based resiliency determination logic 608, the store 610, the discovery logic 612, the execution logic 614, the index calculation logic 616, the index analysis logic 618, the aggregation logic 620, the alert logic 622, use determination logic 624, the categorization logic 626, the weight assignment logic 628, the dependency determination logic 630, the service inclusion logic 632, and/or the causation logic 634.

Figure 7:
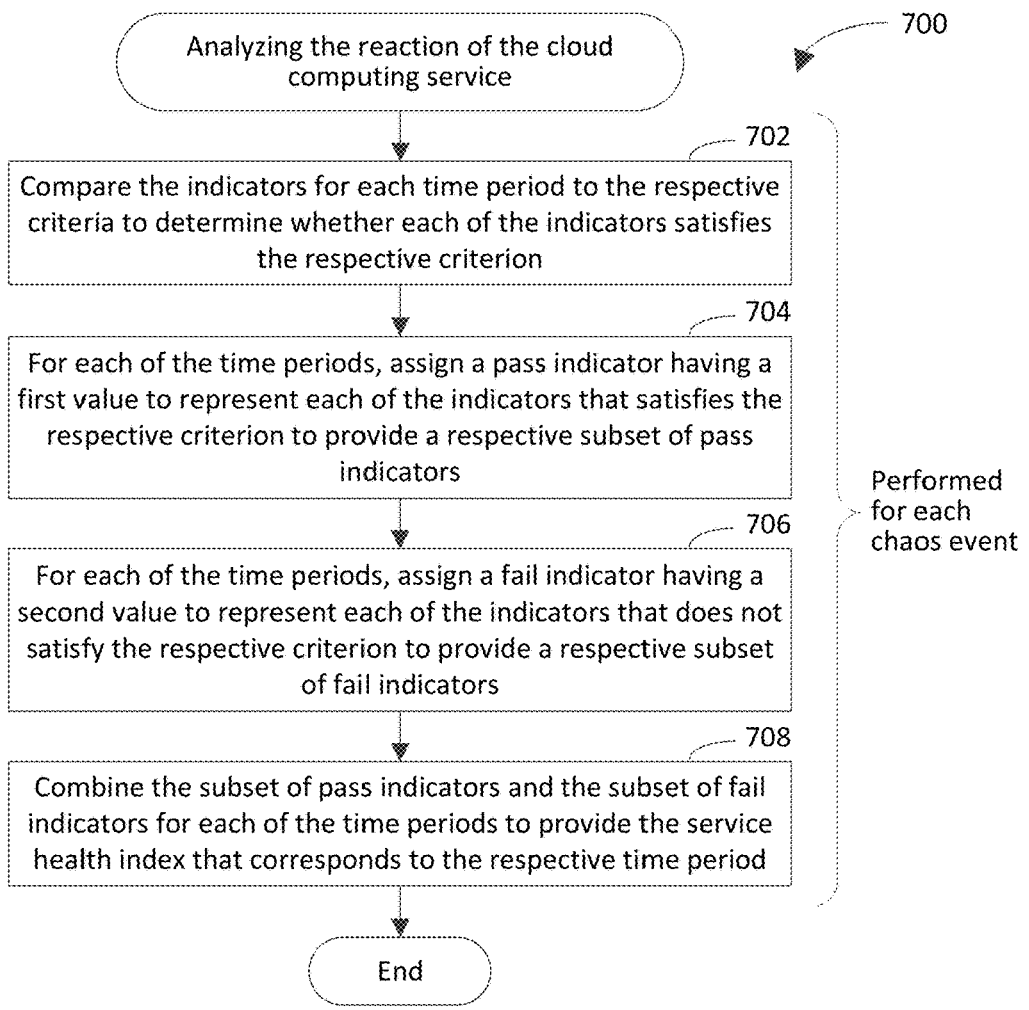
FIGS. 7-8 depict flowcharts of example methods for analyzing the reaction of the cloud computing service in accordance with embodiments.
Figure 8:
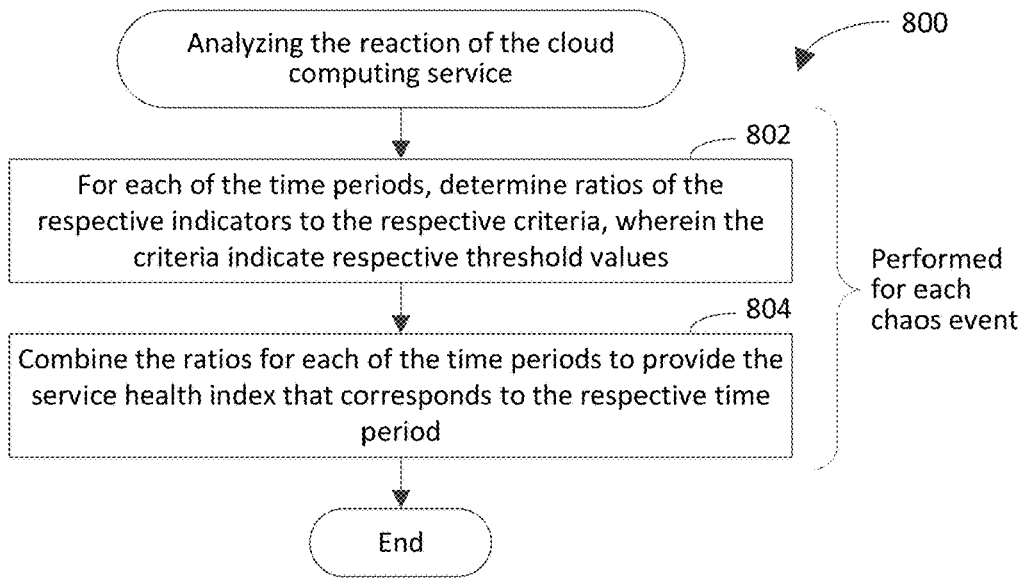
Figure 9:
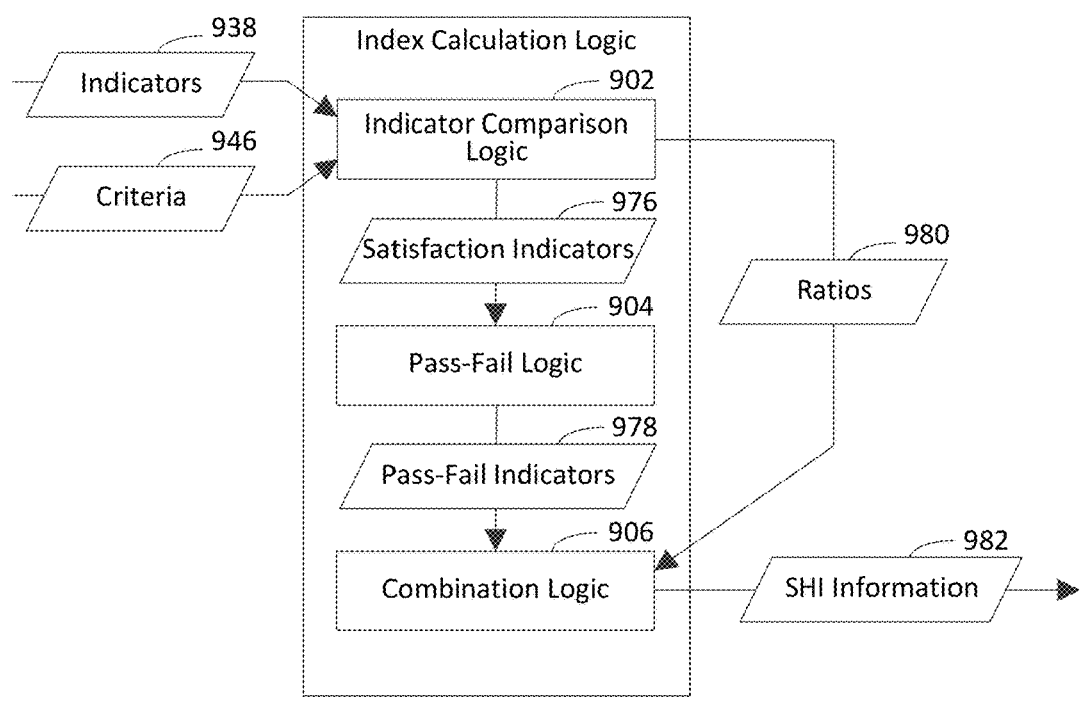
FIG. 9 is a block diagram of an example implementation of index calculation logic shown in FIG. 6 in accordance with an embodiment.

Analyzing the reaction of the cloud computing service for each of the chaos events at step 206 of flowchart 200 may include one or more of the steps shown in flowchart 700 of FIG. 7 and/or one or more of the steps shown in flowchart 800 of FIG. 8. Flowcharts 700 and 800 may be performed by the index calculation logic 616 shown in FIG. 6, for example, for each of the chaos events. For instance, the steps shown in flowchart 700 and/or flowchart 800 may be performed a first time for a first chaos event, a second time for a second chaos event, and so on. Each of the steps may be performed simultaneously for the chaos events, consecutively for the chaos events, or in any other suitable manner. For illustrative purposes, flowcharts 700 and 800 are described with respect to index calculation logic 900 shown in FIG. 9, which is an example implementation of the index calculation logic 616. As shown in FIG. 9, the index calculation logic 900 includes indicator comparison logic 902, pass-fail logic 904, and combination logic 906. Further structural and operational embodiments will be apparent to persons skilled in the relevant art(s) based on the discussion regarding flowcharts 700 and 800.

As shown in FIG. 7, the method of flowchart 700 begins at step 702. In step 702, the indicators for each time period are compared to the respective criteria to determine whether each of the indicators satisfies the respective criterion. In an example implementation, the indicator comparison logic 902 compares the indicators for each time period, which are included among indicators 938, to the respective criteria, which are included among criteria 946, to determine whether each of the indicators satisfies the respective criterion. The indicator comparison logic 902 may generate satisfaction indicators 976 to indicate whether each of the indicators satisfies the respective criterion.

At step 704, for each of the time periods, a pass indicator having a first value is assigned to represent each of the indicators that satisfies the respective criterion to provide a respective subset of pass indicators. In an example implementation, for each of the time periods, pass-fail logic 904 assigns a pass indicator having a first value to represent each of the indicators that satisfies the respective criterion to provide a respective subset of pass indicators. Each subset of the pass indicators may indicate the time period with which the subset corresponds.

At step 706, for each of the time periods, a fail indicator having a second value is assigned to represent each of the indicators that does not satisfy the respective criterion to provide a respective subset of fail indicators. The second value is different from the first value. For instance, the first value of each pass indicator may be a first binary value (e.g., 1), and the second value of each fail indicator may be a second binary value (e.g., 0). In an example implementation, for each of the time periods, pass-fail logic 904 assigns a fail indicator having a second value to represent each of the indicators that does not satisfy the respective criterion to provide a respective subset of pass indicators. Each subset of the fail indicators may indicate the time period with which the subset corresponds. The pass-fail logic 904 generates pass-fail indicators 978 to include each subset of the pass indicators and each subset of the fail indicators.

At step 708, the subset of pass indicators and the subset of fail indicators for each of the time periods are combined to provide the SHI that corresponds to the respective time period. In an example implementation, the combination logic 906 combines the subset of pass indicators and the subset of fail indicators for each of the time periods to provide the SHI that corresponds to the respective time period. For instance, the combination logic 906 may review the pass-fail indicators 978 to determine which subset of the pass indicators and which subset of the fail indicators correspond to each time period. The combination logic 906 may generate SHI information to indicate (e.g., include) the SHIs that correspond to the respective time periods.

As shown in FIG. 8, the method of flowchart 800 begins at step 802. In step 802, for each of the time periods, ratios of the respective indicators to the respective criteria are determined. The criteria indicate respective threshold values. In an example implementation, for each of the time periods, the indicator comparison logic 902 determines ratios 980 of the respective indicators, which are included among the indicators 938, to the respective criteria, which are included among the criteria 946. The criteria indicate respective threshold values.

At step 804, the ratios for each of the time periods are combined to provide the SHI that corresponds to the respective time period. For instance, the ratios for a first time period are combined to provide a first SHI; the ratios for a second time period are combined to provide a second SHI, and so on. In an example implementation, the combination logic 906 combines the ratios for each of the time periods to provide the SHI that corresponds to the respective time period. The combination logic 906 may generate the SHI information 982 to indicate (e.g., include) the SHIs that correspond to the respective time periods.

It will be recognized that the index calculation logic 900 may not include one or more of the indicator comparison logic 902, the pass-fail logic 904, and/or the combination logic 906. Furthermore, the index calculation logic 900 may include components in addition to or in lieu of the indicator comparison logic 902, the pass-fail logic 904, and/or the combination logic 906.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the aggregation-based resiliency determination logic 108, the aggregation-based resiliency determination logic 608, the discovery logic 612, the execution logic 614, the index calculation logic 616, the index analysis logic 618, the aggregation logic 620, the alert logic 622, the use determination logic 624, the categorization logic 626, the weight assignment logic 628, the dependency determination logic 630, the service inclusion logic 632, the causation logic 634, the indicator comparison logic 902, the pass-fail logic 904, the combination logic 906, flowchart 200, flowchart 300, flowchart 400, flowchart 500, flowchart 700, and/or flowchart 800 may be implemented in hardware, software, firmware, or any combination thereof.

For example, any one or more of the aggregation-based resiliency determination logic 108, the aggregation-based resiliency determination logic 608, the discovery logic 612, the execution logic 614, the index calculation logic 616, the index analysis logic 618, the aggregation logic 620, the alert logic 622, the use determination logic 624, the categorization logic 626, the weight assignment logic 628, the dependency determination logic 630, the service inclusion logic 632, the causation logic 634, the indicator comparison logic 902, the pass-fail logic 904, the combination logic 906, flowchart 200, flowchart 300, flowchart 400, flowchart 500, flowchart 700, and/or flowchart 800 may be implemented, at least in part, as computer program code configured to be executed in one or more processors.

In another example, any one or more of the aggregation-based resiliency determination logic 108, the aggregation-based resiliency determination logic 608, the discovery logic 612, the execution logic 614, the index calculation logic 616, the index analysis logic 618, the aggregation logic 620, the alert logic 622, the use determination logic 624, the categorization logic 626, the weight assignment logic 628, the dependency determination logic 630, the service inclusion logic 632, the causation logic 634, the indicator comparison logic 902, the pass-fail logic 904, the combination logic 906, flowchart 200, flowchart 300, flowchart 400, flowchart 500, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
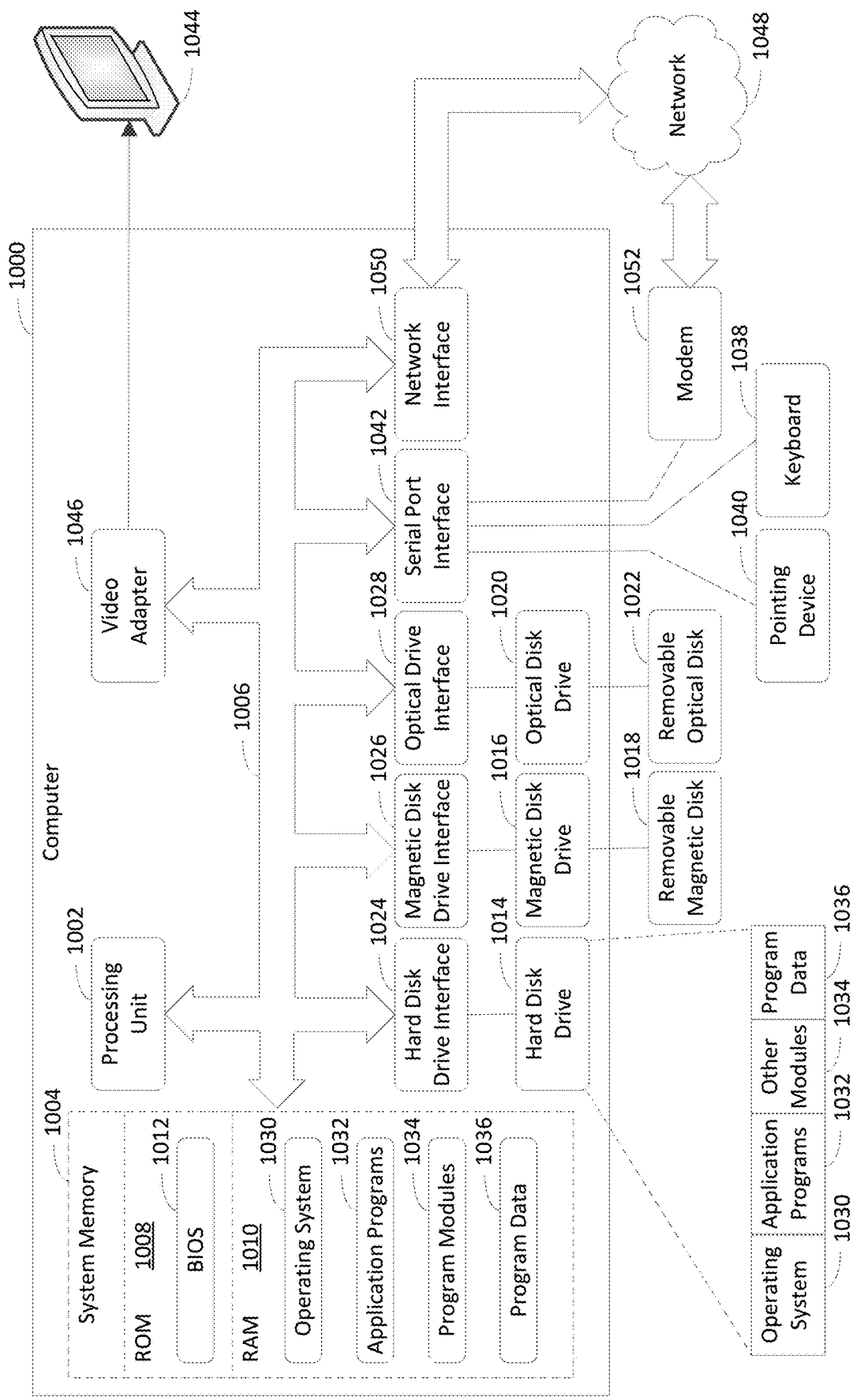
FIG. 10 depicts an example computer in which embodiments may be implemented.

III. Further Discussion of Some Example Embodiments (A1) An example system (FIG. 1, 106A-106N; FIG. 6, 600; FIG. 10, 1000) to perform aggregation-based determination of cloud computing service resiliency to chaos events comprises memory (FIG. 10, 1004, 1008, 1010) and one or more processors (FIG. 10, 1002) coupled to the memory. The one or more processors are configured to discover (FIG. 2, 202) a plurality of chaos events. The one or more processors are further configured to execute (FIG. 2, 204) the plurality of chaos events against a cloud computing service (FIG. 1, 110) during a time frame that includes a plurality of time periods. The one or more processors are further configured to, for each of the plurality of chaos events, analyze (FIG. 2, 206) a reaction of the cloud computing service to execution of the respective chaos event by calculating a plurality of service health indexes that correspond to the plurality of respective time periods. Each service health index indicates an extent to which a plurality of indicators (FIG. 6, 638), which represent a plurality of respective measurements of performance of the cloud computing service that are performed with regard to a plurality of respective attributes of the cloud computing service during the respective time period, satisfies a plurality of respective criteria (FIG. 6, 646). The one or more processors are further configured to, for each of the plurality of chaos events, analyze (FIG. 2, 208) the service health indexes for the respective chaos event to provide a respective resiliency score. The one or more processors are further configured to aggregate (FIG. 2, 210) at least some of the resiliency scores (FIG. 6, 660) of the respective chaos events to provide an aggregated resiliency score (FIG. 6, 662), which represents resiliency of the cloud computing service to the plurality of chaos events.

(A2) In the example system of A1, wherein the one or more processors are configured to: for each of the plurality of chaos events, combine the plurality of indicators for each time period with a plurality of respective weights to provide a plurality of weighted indicators for the respective time period; and for each of the plurality of chaos events, calculate each service health index based at least in part on the plurality of weighted indicators for the respective time period.

(A3) In the example system of any of A1-A2, wherein the one or more processors are configured to: for each of the plurality of chaos events, perform the following: compare the plurality of indicators for each time period to the plurality of respective criteria to determine whether each of the plurality of indicators satisfies the respective criterion; for each of the plurality of time periods, assign a pass indicator having a first value to represent each of the plurality of indicators that satisfies the respective criterion to provide a respective subset of pass indicators; for each of the plurality of time periods, assign a fail indicator having a second value to represent each of the plurality of indicators that does not satisfy the respective criterion to provide a respective subset of fail indicators; and combine the subset of pass indicators and the subset of fail indicators for each of the plurality of time periods to provide the service health index that corresponds to the respective time period.

(A4) In the example system of any of A1-A3, wherein the one or more processors are configured to: for each of the plurality of chaos events, perform the following: for each of the plurality of time periods, determine a plurality of ratios of the plurality of respective indicators to the plurality of respective criteria, wherein the plurality of criteria indicate a plurality of respective threshold values; and combine the plurality of ratios for each of the plurality of time periods to provide the service health index that corresponds to the respective time period.

(A5) In the example system of any of A1-A4, wherein the one or more processors are configured to: for at least one of the plurality of chaos events, sum at least first and second ratios of the plurality of ratios for a time period to provide the service health index that corresponds to the respective time period. The first ratio includes a first indicator of the plurality of indicators divided by a first criterion of the plurality of criteria. The second ratio includes a second criterion of the plurality of criteria divided by a second indicator of the plurality of indicators. The first criterion indicates a minimum threshold. The second criterion indicates a maximum threshold.

(A6) In the example system of any of A1-A5, wherein the one or more processors are configured to: for each of the plurality of chaos events, combine the plurality of service health indexes with a plurality of respective weights to provide a plurality of weighted service health indexes; and for each of the plurality of chaos events, analyze the weighted service health indexes for the respective chaos event to provide the respective resiliency score.

(A7) In the example system of any of A1-A6, wherein the one or more processors are further configured to: determine an extent to which the cloud computing service is used during each of the plurality of time periods; and establish the plurality of weights to represent the respective extents to which the cloud computing service is used during the plurality of respective time periods.

(A8) In the example system of any of A1-A7, wherein the one or more processors are configured to: determine an extent to which the cloud computing service is used during each of the plurality of time periods; compare the extent to which the cloud computing service is used during each of the plurality of time periods to a usage threshold; and for each of the plurality of chaos events, take a first subset of the service health indexes for the respective chaos event into consideration and not take a second subset of the service health indexes for the respective chaos event into consideration to provide the respective resiliency score. The first subset includes each service health index for the respective chaos event that corresponds to a time period during which the extent to which the cloud computing service is used is greater than or equal to the usage threshold. The second subset includes each service health index for the respective chaos event that corresponds to a time period during which the extent to which the cloud computing service is used is less than the usage threshold.

(A9) In the example system of any of A1-A8, wherein each service health index indicates the extent to which a plurality of service level indicators satisfies the plurality of respective criteria that are defined by a service level objective that is associated with the cloud computing service.

(A10) In the example system of any of A1-A9, wherein the resiliency score for at least one of the plurality of chaos events is based at least in part on a time to recover from the respective chaos event; wherein a relatively lesser time to recover has a positive effect on the resiliency score; and wherein a relatively greater time to recover has a negative effect on the resiliency score.

(A11) In the example system of any of A1-A10, wherein the one or more processors are configured to: calculate an average of the resiliency scores of the respective chaos events; and generate the aggregated resiliency score to include a ratio of the average of the resiliency scores of the respective chaos events to a target resiliency score.

(A12) In the example system of any of A1-A11, wherein the one or more processors are further configured to: compare the aggregated resiliency score to a score threshold to determine whether the aggregated resiliency score is less than the score threshold; and provide an alert to a provider of the cloud computing service based on a determination that the aggregated resiliency score is less than the score threshold, the alert indicating that the aggregated resiliency score is less than the score threshold.

(A13) In the example system of any of A1-A12, wherein the aggregated resiliency score is a first aggregated resiliency score; and wherein the one or more processors are further configured to: execute the plurality of chaos events against the cloud computing service during a second time frame that includes a plurality of second time periods and that follows aggregation of the resiliency scores to provide the aggregated resiliency score; for each of the plurality of chaos events, calculate a plurality of second service health indexes that correspond to the plurality of respective second time periods, each second service health index indicating an extent to which a plurality of second indicators, which represent a plurality of respective measurements of performance of the cloud computing service that are performed with regard to the plurality of respective attributes of the cloud computing service during the respective second time period, satisfies the plurality of respective criteria; for each of the plurality of chaos events, analyze the second service health indexes for the respective chaos event to provide a respective second resiliency score; aggregate at least some of the second resiliency scores of the respective chaos events to provide a second aggregated resiliency score, which represents the resiliency of the cloud computing service to the plurality of chaos events; compare the second aggregated resiliency score to the first aggregated resiliency score to determine whether the second aggregated resiliency score is less than the first aggregated resiliency score; and provide an alert to a provider of the cloud computing service based at least in part on the second aggregated resiliency score being less than the first aggregated resiliency score, the alert indicating that the second aggregated resiliency score is less than the first aggregated resiliency score.

(A14) In the example system of any of A1-A13, wherein the one or more processors are configured to: for each of the plurality of chaos events, analyze the service health indexes for the respective chaos event to provide the respective resiliency score based at least in part on a maturity of the respective chaos event being less than or equal to a maturity capability of the cloud computing service. The maturity of each chaos event indicates a severity of the respective chaos event based at least in part on at least one of a scope of the respective chaos event, an intensity of the respective chaos event, or a duration of the respective chaos event. The scope of each chaos event indicates a number of machines for which operational performance is reduced by the respective chaos event. The intensity of each chaos event indicates an extent to which the operational performance of at least one machine is reduced by the respective chaos event. The duration of each chaos event indicates an amount of time over which the respective chaos event occurs. The maturity capability of the cloud computing service indicates a severity of chaos events from which the cloud computing service is capable of recovering.

(B1) An example method of performing aggregation-based determination of cloud computing service resiliency to chaos events, the method implemented by a computing system (FIG. 1, 106A-106N; FIG. 6, 600; FIG. 10, 1000), comprises: discovering (FIG. 2, 202) a plurality of chaos events; executing (FIG. 2, 204) the plurality of chaos events against a cloud computing service (FIG. 1, 110) during a time frame that includes a plurality of time periods; for each of the plurality of chaos events, analyzing (FIG. 2, 206) a reaction of the cloud computing service to execution of the respective chaos event by calculating a plurality of service health indexes that correspond to the plurality of respective time periods, each service health index indicating an extent to which a plurality of indicators (FIG. 6, 638), which represent a plurality of respective measurements of performance of the cloud computing service that are performed with regard to a plurality of respective attributes of the cloud computing service during the respective time period, satisfies a plurality of respective criteria (FIG. 6, 646); for each of the plurality of chaos events, analyzing (FIG. 2, 208) the service health indexes for the respective chaos event to provide a respective resiliency score; and aggregating (FIG. 2, 210) at least some of the resiliency scores (FIG. 6, 660) of the respective chaos events to provide an aggregated resiliency score (FIG. 6, 662), which represents resiliency of the cloud computing service to the plurality of chaos events.

(B2) In the method of B1, further comprising: categorizing the plurality of chaos events among a plurality of event types, each event type including one or more chaos events of the plurality of chaos events; assigning a plurality of weights to the plurality of respective event types, each weight indicating a maturity of the one or more chaos events in the respective event type, the maturity of the one or more chaos events in each event type indicating a severity of the one or more chaos events based at least in part on at least one of a scope of the one or more chaos events, an intensity of the one or more chaos events, or a duration of the one or more chaos events, the scope of the one or more chaos events in each event type indicating a number of machines for which operational performance is reduced by the one or more chaos events, the intensity of the one or more chaos events in each event type indicating an extent to which the operational performance of at least one machine is reduced by the one or more chaos events, the duration of the one or more chaos events in each event type indicating an amount of time over which the one or more chaos events occur; determining a most recent chaos event from each event type; and combining the resiliency score of the most recent chaos event from each event type and the weight that is assigned to the respective event type to provide a respective weighted resiliency score for the respective event type; wherein aggregating at least some of the resiliency scores of the respective chaos events to provide an aggregated resiliency score comprises: aggregating at least some of the weighted resiliency scores of the respective event types to provide the aggregated resiliency score.

(B3) In the method of any of B1-B2, wherein executing the plurality of chaos events comprises: executing the plurality of chaos events against a plurality of cloud computing services during a plurality of respective time frames, each time frame including a plurality of time periods; for each of the plurality of chaos events that is executed against each cloud computing service, analyzing a reaction of the respective cloud computing service to execution of the respective chaos event by calculating a plurality of service health indexes that correspond to the plurality of respective time periods for the respective cloud computing service, each service health index indicating an extent to which a plurality of indicators, which represent a plurality of respective measurements of performance of the respective cloud computing service that are performed with regard to a plurality of respective attributes of the respective cloud computing service during the respective time period, satisfies a plurality of respective criteria; for each of the plurality of chaos events that is executed against each cloud computing service, analyzing the service health indexes for the respective chaos event that is executed against the respective cloud computing service to provide a respective resiliency score; and aggregating at least some of the resiliency scores of the respective chaos events that are executed against each cloud computing service to provide a respective aggregated resiliency score, which represents resiliency of the respective cloud computing service to the plurality of chaos events.

(B4) In the method of any of B1-B3, further comprising: determining that a specified cloud computing service depends on a dependent cloud computing service, which is included among the plurality of cloud computing services; and adding the specified cloud computing service to the plurality of cloud computing services based at least in part on a determination that the specified cloud computing service depends on the dependent cloud computing service; wherein executing the plurality of chaos events against the plurality of cloud computing services comprises: executing the plurality of chaos events against the specified cloud computing service based at least in part on the determination that the specified cloud computing service depends on the dependent cloud computing service.

(B5) In the method of any of B1-B4, further comprising: determining that a first aggregated resiliency score of a first cloud computing service has a causal effect on a second aggregated resiliency score of a second cloud computing service; and determining that the second cloud computing service depends on the first cloud computing service based at least in part on a determination that the first aggregated resiliency score has a causal effect on the second aggregated resiliency score.

(B6) In the method of any of B1-B5, wherein the plurality of time frames are same; and wherein the method further comprises: comparing the aggregated resiliency scores of the respective cloud computing services to identify a first aggregated resiliency score of a first cloud computing service that is less than the aggregated resiliency scores of the other cloud computing services; and providing an alert to a provider of the first cloud computing service, the alert indicating that the first aggregated resiliency score of the first cloud computing service is less than the aggregated resiliency scores of the other cloud computing services.

(C1) An example computer program product (FIG. 10, 1018, 1022) comprising a computer-readable storage medium having instructions recorded thereon for enabling a processor-based system (FIG. 1, 106A-106N; FIG. 6, 600; FIG. 10, 1000) to perform aggregation-based determination of cloud computing service resiliency to chaos events by performing operations, the operations comprising: discovering (FIG. 2, 202) a plurality of chaos events; executing (FIG. 2, 204) the plurality of chaos events against a cloud computing service (FIG. 1, 110) during a time frame that includes a plurality of time periods; for each of the plurality of chaos events, analyzing (FIG. 2, 206) a reaction of the cloud computing service to execution of the respective chaos event by calculating a plurality of service health indexes that correspond to the plurality of respective time periods, each service health index indicating an extent to which a plurality of indicators (FIG. 6, 638), which represent a plurality of respective measurements of performance of the cloud computing service that are performed with regard to a plurality of respective attributes of the cloud computing service during the respective time period, satisfies a plurality of respective criteria (FIG. 6, 646); for each of the plurality of chaos events, analyzing (FIG. 2, 208) the service health indexes for the respective chaos event to provide a respective resiliency score; and aggregating (FIG. 2, 210) at least some of the resiliency scores (FIG. 6, 660) of the respective chaos events to provide an aggregated resiliency score (FIG. 6, 662), which represents resiliency of the cloud computing service to the plurality of chaos events.

IV. Example Computer System

FIG. 10 depicts an example computer 1000 in which embodiments may be implemented. Any one or more of the user devices 102A-102M and/or any one or more of the servers 106A-106N shown in FIG. 1 and/or computing system 600 shown in FIG. 6 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of (e.g., at least a portion of) the aggregation-based resiliency determination logic 108, the aggregation-based resiliency determination logic 608, the discovery logic 612, the execution logic 614, the index calculation logic 616, the index analysis logic 618, the aggregation logic 620, the alert logic 622, the use determination logic 624, the categorization logic 626, the weight assignment logic 628, the dependency determination logic 630, the service inclusion logic 632, the causation logic 634, the indicator comparison logic 902, the pass-fail logic 904, the combination logic 906, flowchart 200 (including any step of flowchart 200), flowchart 300 (including any step of flowchart 300), flowchart 400 (including any step of flowchart 400), flowchart 500 (including any step of flowchart 500), flowchart 700 (including any step of flowchart 700), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to perform aggregation-based determination of cloud computing service resiliency to chaos events, the system comprising:
memory; and
one or more processors coupled to the memory, the one or more processors configured to:
discover a plurality of chaos events;
execute the plurality of chaos events against a cloud computing service during a time frame that includes a plurality of time periods;
for each of the plurality of chaos events, analyze a reaction of the cloud computing service to execution of the respective chaos event by calculating a plurality of service health indexes that correspond to the plurality of respective time periods, each service health index indicating an extent to which a plurality of indicators, which represent a plurality of respective measurements of performance of the cloud computing service that are performed with regard to a plurality of respective attributes of the cloud computing service during the respective time period, satisfies a plurality of respective criteria;
for each of the plurality of chaos events, analyze the service health indexes for the respective chaos event to provide a respective resiliency score; and
aggregate at least some of the resiliency scores of the respective chaos events to provide an aggregated resiliency score, which represents resiliency of the cloud computing service to the plurality of chaos events.

2. The system of claim 1, wherein the one or more processors are configured to:
for each of the plurality of chaos events, perform the following:
for each of the plurality of time periods, determine a plurality of ratios of the plurality of respective indicators to the plurality of respective criteria, wherein the plurality of criteria indicate a plurality of respective threshold values; and
combine the plurality of ratios for each of the plurality of time periods to provide the service health index that corresponds to the respective time period.

3. The system of claim 2, wherein the one or more processors are configured to:
for at least one of the plurality of chaos events, sum at least first and second ratios of the plurality of ratios for a time period to provide the service health index that corresponds to the respective time period, the first ratio including a first indicator of the plurality of indicators divided by a first criterion of the plurality of criteria, the second ratio including a second criterion of the plurality of criteria divided by a second indicator of the plurality of indicators, wherein the first criterion indicates a minimum threshold, wherein the second criterion indicates a maximum threshold.

4. The system of claim 1, wherein the one or more processors are configured to:
for each of the plurality of chaos events, combine the plurality of service health indexes with a plurality of respective weights to provide a plurality of weighted service health indexes; and
for each of the plurality of chaos events, analyze the weighted service health indexes for the respective chaos event to provide the respective resiliency score.

5. The system of claim 4, wherein the one or more processors are further configured to:
determine an extent to which the cloud computing service is used during each of the plurality of time periods; and
establish the plurality of weights to represent the respective extents to which the cloud computing service is used during the plurality of respective time periods.

6. The system of claim 1, wherein the one or more processors are configured to:
for each of the plurality of chaos events, combine the plurality of indicators for each time period with a plurality of respective weights to provide a plurality of weighted indicators for the respective time period; and
for each of the plurality of chaos events, calculate each service health index based at least in part on the plurality of weighted indicators for the respective time period.

7. The system of claim 1, wherein the one or more processors are configured to:
for each of the plurality of chaos events, perform the following:
compare the plurality of indicators for each time period to the plurality of respective criteria to determine whether each of the plurality of indicators satisfies the respective criterion;
for each of the plurality of time periods, assign a pass indicator having a first value to represent each of the plurality of indicators that satisfies the respective criterion to provide a respective subset of pass indicators;
for each of the plurality of time periods, assign a fail indicator having a second value to represent each of the plurality of indicators that does not satisfy the respective criterion to provide a respective subset of fail indicators; and
combine the subset of pass indicators and the subset of fail indicators for each of the plurality of time periods to provide the service health index that corresponds to the respective time period.

8. The system of claim 1, wherein the one or more processors are configured to:
determine an extent to which the cloud computing service is used during each of the plurality of time periods;
compare the extent to which the cloud computing service is used during each of the plurality of time periods to a usage threshold; and
for each of the plurality of chaos events, take a first subset of the service health indexes for the respective chaos event into consideration and not take a second subset of the service health indexes for the respective chaos event into consideration to provide the respective resiliency score,
the first subset including each service health index for the respective chaos event that corresponds to a time period during which the extent to which the cloud computing service is used is greater than or equal to the usage threshold,
the second subset including each service health index for the respective chaos event that corresponds to a time period during which the extent to which the cloud computing service is used is less than the usage threshold.

9. The system of claim 1, wherein each service health index indicates the extent to which a plurality of service level indicators satisfies the plurality of respective criteria that are defined by a service level objective that is associated with the cloud computing service.

10. The system of claim 1, wherein the resiliency score for at least one of the plurality of chaos events is based at least in part on a time to recover from the respective chaos event;
   wherein a relatively lesser time to recover has a positive effect on the resiliency score; and
   wherein a relatively greater time to recover has a negative effect on the resiliency score.

11. The system of claim 1, wherein the one or more processors are configured to:
   calculate an average of the resiliency scores of the respective chaos events; and
   generate the aggregated resiliency score to include a ratio of the average of the resiliency scores of the respective chaos events to a target resiliency score.

12. The system of claim 1, wherein the one or more processors are further configured to:
   compare the aggregated resiliency score to a score threshold to determine whether the aggregated resiliency score is less than the score threshold; and
   provide an alert to a provider of the cloud computing service based on a determination that the aggregated resiliency score is less than the score threshold, the alert indicating that the aggregated resiliency score is less than the score threshold.

13. The system of claim 1, wherein the aggregated resiliency score is a first aggregated resiliency score; and
   wherein the one or more processors are further configured to:
      execute the plurality of chaos events against the cloud computing service during a second time frame that includes a plurality of second time periods and that follows aggregation of the resiliency scores to provide the aggregated resiliency score;
      for each of the plurality of chaos events, calculate a plurality of second service health indexes that correspond to the plurality of respective second time periods, each second service health index indicating an extent to which a plurality of second indicators, which represent a plurality of respective measurements of performance of the cloud computing service that are performed with regard to the plurality of respective attributes of the cloud computing service during the respective second time period, satisfies the plurality of respective criteria;
      for each of the plurality of chaos events, analyze the second service health indexes for the respective chaos event to provide a respective second resiliency score;
      aggregate at least some of the second resiliency scores of the respective chaos events to provide a second aggregated resiliency score, which represents the resiliency of the cloud computing service to the plurality of chaos events;
      compare the second aggregated resiliency score to the first aggregated resiliency score to determine whether the second aggregated resiliency score is less than the first aggregated resiliency score; and
      provide an alert to a provider of the cloud computing service based at least in part on the second aggregated resiliency score being less than the first aggregated resiliency score, the alert indicating that the second aggregated resiliency score is less than the first aggregated resiliency score.

14. The system of claim 1, wherein the one or more processors are configured to:
   for each of the plurality of chaos events, analyze the service health indexes for the respective chaos event to provide the respective resiliency score based at least in part on a maturity of the respective chaos event being less than or equal to a maturity capability of the cloud computing service,
      the maturity of each chaos event indicating a severity of the respective chaos event based at least in part on at least one of a scope of the respective chaos event, an intensity of the respective chaos event, or a duration of the respective chaos event,
      the scope of each chaos event indicating a number of machines for which operational performance is reduced by the respective chaos event,
      the intensity of each chaos event indicating an extent to which the operational performance of at least one machine is reduced by the respective chaos event,
      the duration of each chaos event indicating an amount of time over which the respective chaos event occurs,
      the maturity capability of the cloud computing service indicating a severity of chaos events from which the cloud computing service is capable of recovering.

15. A method of performing aggregation-based determination of cloud computing service resiliency to chaos events, the method implemented by a computing system, the method comprising:
   discovering a plurality of chaos events;
   executing the plurality of chaos events against a cloud computing service during a time frame that includes a plurality of time periods;
   for each of the plurality of chaos events, analyzing a reaction of the cloud computing service to execution of the respective chaos event by calculating a plurality of service health indexes that correspond to the plurality of respective time periods, each service health index indicating an extent to which a plurality of indicators, which represent a plurality of respective measurements of performance of the cloud computing service that are performed with regard to a plurality of respective attributes of the cloud computing service during the respective time period, satisfies a plurality of respective criteria;
   for each of the plurality of chaos events, analyzing the service health indexes for the respective chaos event to provide a respective resiliency score; and
   aggregating at least some of the resiliency scores of the respective chaos events to provide an aggregated resiliency score, which represents resiliency of the cloud computing service to the plurality of chaos events.

16. The method of claim 15, wherein executing the plurality of chaos events comprises:
   executing the plurality of chaos events against a plurality of cloud computing services during a plurality of respective time frames, each time frame including a plurality of time periods;
   for each of the plurality of chaos events that is executed against each cloud computing service, analyzing a reaction of the respective cloud computing service to execution of the respective chaos event by calculating a plurality of service health indexes that correspond to the plurality of respective time periods for the respective cloud computing service, each service health index indicating an extent to which a plurality of indicators, which represent a plurality of respective measurements of performance of the respective cloud computing service that are performed with regard to a plurality of respective attributes of the respective cloud computing service during the respective time period, satisfies a plurality of respective criteria;

for each of the plurality of chaos events that is executed against each cloud computing service, analyzing the service health indexes for the respective chaos event that is executed against the respective cloud computing service to provide a respective resiliency score; and aggregating at least some of the resiliency scores of the respective chaos events that are executed against each cloud computing service to provide a respective aggregated resiliency score, which represents resiliency of the respective cloud computing service to the plurality of chaos events.

17. The method of claim 16, further comprising:

determining that a specified cloud computing service depends on a dependent cloud computing service, which is included among the plurality of cloud computing services; and adding the specified cloud computing service to the plurality of cloud computing services based at least in part on a determination that the specified cloud computing service depends on the dependent cloud computing service;

wherein executing the plurality of chaos events against the plurality of cloud computing services comprises:

executing the plurality of chaos events against the specified cloud computing service based at least in part on the determination that the specified cloud computing service depends on the dependent cloud computing service.

18. The method of claim 16, further comprising:

determining that a first aggregated resiliency score of a first cloud computing service has a causal effect on a second aggregated resiliency score of a second cloud computing service; and determining that the second cloud computing service depends on the first cloud computing service based at least in part on a determination that the first aggregated resiliency score has a causal effect on the second aggregated resiliency score.

19. The method of claim 16, wherein the plurality of time frames are same; and wherein the method further comprises:

comparing the aggregated resiliency scores of the respective cloud computing services to identify a first aggregated resiliency score of a first cloud computing service that is less than the aggregated resiliency scores of the other cloud computing services; and providing an alert to a provider of the first cloud computing service, the alert indicating that the first aggregated resiliency score of the first cloud computing service is less than the aggregated resiliency scores of the other cloud computing services.

20. The method of claim 15, further comprising:

categorizing the plurality of chaos events among a plurality of event types, each event type including one or more chaos events of the plurality of chaos events;

assigning a plurality of weights to the plurality of respective event types, each weight indicating a maturity of the one or more chaos events in the respective event type, the maturity of the one or more chaos events in each event type indicating a severity of the one or more chaos events based at least in part on at least one of a scope of the one or more chaos events, an intensity of the one or more chaos events, or a duration of the one or more chaos events, the scope of the one or more chaos events in each event type indicating a number of machines for which operational performance is reduced by the one or more chaos events, the intensity of the one or more chaos events in each event type indicating an extent to which the operational performance of at least one machine is reduced by the one or more chaos events, the duration of the one or more chaos events in each event type indicating an amount of time over which the one or more chaos events occur;

determining a most recent chaos event from each event type; and combining the resiliency score of the most recent chaos event from each event type and the weight that is assigned to the respective event type to provide a respective weighted resiliency score for the respective event type;

wherein aggregating at least some of the resiliency scores of the respective chaos events to provide an aggregated resiliency score comprises:

aggregating at least some of the weighted resiliency scores of the respective event types to provide the aggregated resiliency score.

21. A computer program product comprising a computer-readable storage medium having instructions recorded thereon for enabling a processor-based system to perform aggregation-based determination of cloud computing service resiliency to chaos events by performing operations, the operations comprising:

discovering a plurality of chaos events;

executing the plurality of chaos events against a cloud computing service during a time frame that includes a plurality of time periods;

for each of the plurality of chaos events, analyzing a reaction of the cloud computing service to execution of the respective chaos event by calculating a plurality of service health indexes that correspond to the plurality of respective time periods, each service health index indicating an extent to which a plurality of indicators, which represent a plurality of respective measurements of performance of the cloud computing service that are performed with regard to a plurality of respective attributes of the cloud computing service during the respective time period, satisfies a plurality of respective criteria;

for each of the plurality of chaos events, analyzing the service health indexes for the respective chaos event to provide a respective resiliency score; and aggregating at least some of the resiliency scores of the respective chaos events to provide an aggregated resiliency score, which represents resiliency of the cloud computing service to the plurality of chaos events.

* * * * *